United States Patent [19]
Shimomura

[11] 3,843,872
[45] Oct. 22, 1974

[54] TEMPERATURE MEASURING EQUIPMENT WITH POLYNOMEAL SYNTHESIS

[76] Inventor: Naonobu Shimomura, 13-8 Sakuragaoka-cho, Shibuya-ku, Tokyo, Japan

[22] Filed: Apr. 27, 1972

[21] Appl. No.: 248,141

[30] Foreign Application Priority Data
Apr. 30, 1971 Japan................................ 46-29112
July 21, 1971 Japan................................ 46-54461
Oct. 4, 1971 Japan................................ 46-77701
Dec. 16, 1971 Japan............................... 46-102036

[52] U.S. Cl.......... 235/92 MT, 73/359, 73/362 AR, 235/151.3, 235/197
[51] Int. Cl....... G06f 1/02, G06f 15/34, G01k 7/00
[58] Field of Search.......... 73/359, 362 R, 362 AR; 235/92 MT, 92 TF, 192 E, 151.3, 197

[56] References Cited
UNITED STATES PATENTS
| | | | |
|---|---|---|---|
| 2,926,247 | 2/1960 | Palmer | 73/362 R UX |
| 3,062,443 | 11/1962 | Palmer | 235/132 E |
| 3,094,875 | 6/1963 | Fluegol | 73/359 |
| 3,274,832 | 9/1966 | Hamilton | 73/339 R |
| 3,555,448 | 1/1971 | Clarke et al. | 331/65 |
| 3,588,481 | 6/1971 | Stroman | 235/151.34 |
| 3,662,163 | 5/1972 | Miller et al. | 235/197 |
| 3,766,782 | 10/1973 | Shimomura | 73/362 AR X |

Primary Examiner—Richard C. Queisser
Assistant Examiner—Frederick Shoon
Attorney, Agent, or Firm—Staas, Halsey & Gable

[57] ABSTRACT

Apparatus for precision temperature measurement in which a temperature measuring resistor or thermocouple is used as a temperature sensor. Such temperature sensor is also used as a standard instrument for the interpolation of, for instance, the temperature range between the defined fixed points of the International Practical Temperature Scale (abbreviated—IPTS, or EIPT in France). The signal from such a sensor is represented by a high order polynomial of a variable as the function of the temperature.

13 Claims, 35 Drawing Figures

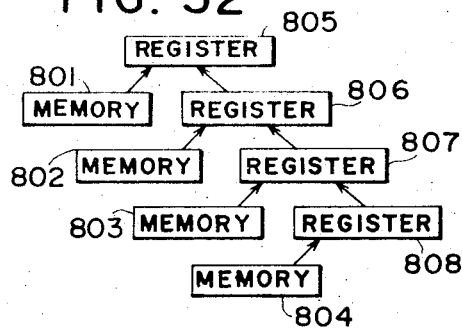
FIG. 32
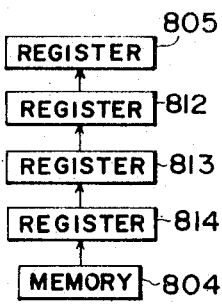
FIG. 33
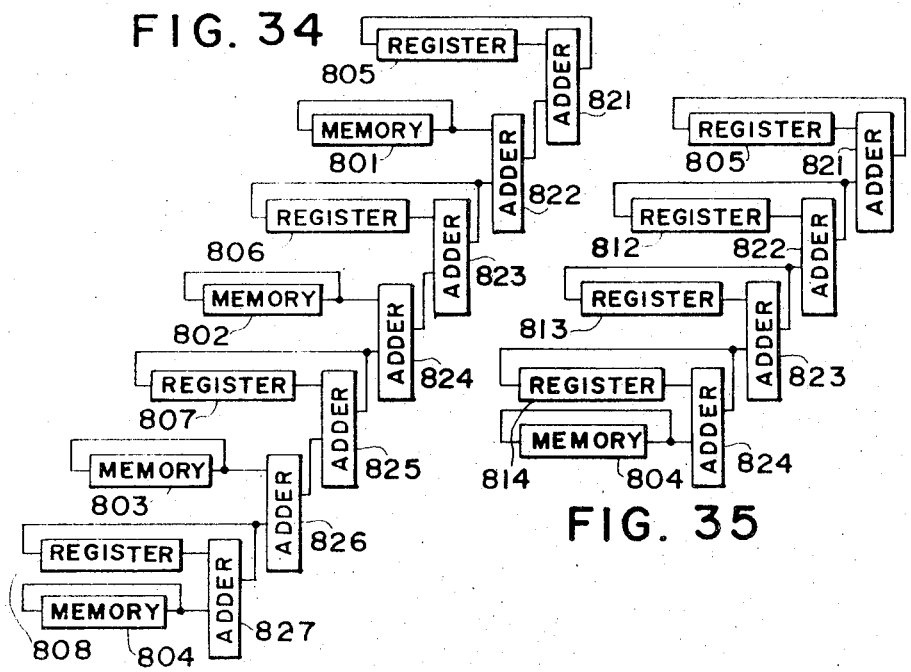
FIG. 34
FIG. 35

TEMPERATURE MEASURING EQUIPMENT WITH POLYNOMEAL SYNTHESIS

According to the invention, extremely precise temperature measurement is provided by digitally and precisely obtaining the corresponding values of such a polynomial by simple method. More particularly, registers or accumulators, capable of accumulating memorized contents, are arranged in cascade, and if the (P) times cascade accumulation is carried out, then the contents of the final, for instance, fourth stage will be given by the equation, $$X = a + bP + cP^2 + iP^3 + lP^4$$

where $P$ represents the number of cascade accumulations and $a, b, c, i$ and $l$ are constants. In another operating mode, by means of properly controlling the cycles of cascade accumulation, the value of $X$ given by $$P = a + bX + cX^2 + iX^3 + lX^4$$

can be obtained in the final stage of the accumulator.

For temperature ranges between 0°C and 630°C and between 630°C and 1,063°C, the electric signal E obtained from a temperature measuring resistor or thermocouple can be represented by the following equation:

$$E = A + BT + CT^2$$

where A, B and C are constants inherent to the temperature sensor. For broader temperature ranges, the terms of higher powers of $P$, $X$ or $T$ are added to the above polynomial equations. The correspondence of the relation between $E$ and $T$ with the relation between $P$ and $X$ results in extremely precise temperature measurement.

BACKGROUND OF THE INVENTION

1. Field of the Invention

This invention relates to apparatus for sensing and measuring temperature, and in particular, to utilizing digital techniques for measuring temperature with great precision.

2. Description of the Prior Art

For precise temperature measurement, a temperature measuring resistor or thermocouple is used as a temperature sensor. Such temperature measuring resistors and thermocouples are used as standard means for temperature measurement for interpolation of the temperature range between the defining fixed points according to the International Practical Temperature Scale (IPTS). Their output characteristic is given either as a quadratic polynomial function or as a fourth order polynomial function of temperature depending upon the temperature range.

Accordingly, linearizers have heretofore been used for the temperature measurement for the purpose of obtaining accurate temperature indications from non-linear electric output signals of temperature sensors. Such linealizers have slightly non-linear input-to-output characteristics to compensate for non-linear characteristics of the temperature sensor. Many of these compensating means have broken line approximation, and are so constructed as to vary effectively the resistances of a circuit according to the magnitude of a voltage coupled to a network including suitably biased diodes and resistors. The voltage applied to the network is non-linearly related to the temperature as detected by the sensor, and the network provides an output in a substantially linear relation to the temperature to be measured.

Other linearizers make use of a non-linear characteristic of an amplifier for compensating for the non-linear character of the sensor. There are also various other compensation methods. All of these compensating means, however, are based on approximation. Therefore, increased precision requires extremely complicated circuit construction, which would encounter various difficulties in manufacture.

SUMMARY OF THE INVENTION

In accordance with the invention, a non-linear counter of either one of two kinds to be described hereinafter, or the generalized form thereof capable of accumulating memorized numbers in a cascade fashion or a combination of such networks, is used to simulate the above-mentioned higher order non-linear relations with extremely high precision, and to provide correction in temperature and other measurements.

The object of the invention, accordingly, is to provide means to obtain digital values in precise correspondence to temperature. The temperature measuring system according to the invention comprises cascade accumulator means for accumulating memorized numbers in cascade and a temperature measuring resistor or thermocouple. The accumulative operation is controlled by so constructing the accumulator that the contents stored in memories may be changed according to the type of sensor, the number of pulses related with accumulation, or according to the count contents of the accumulator. Further, in the case where a thermocouple is used, the reference temperature may be compensated for. Furthermore, not only temperature values but also values of higher order polynomial functions of temperature may be obtained. Moreover, in case of using a thermocouple, sufficiently precise temperature measurement to the practical purposes is possible for temperatures falling outside the International Practical Temperature Scale range.

BRIEF DESCRIPTION OF THE DRAWINGS

While the specification concludes with claims particularly pointing out and distinctly claiming the subject matter which is regarded as the invention, some preferred embodiments of the invention are disclosed in the following detailed description taken in conjunction with the accompanying drawings, in which:

FIGS. 21 to 24 illustrate an embodiment of a measuring circuit where the reference temperature of a thermocouple is compensated for;

FIGS. 32 and 33 are block diagrams showing cascade accumulators used in accordance with the invention; and FIGS. 34 and 35 are block diagrams showing further cascade accumulators embodying the invention.

DESCRIPTION OF THE PREFERRED EMBODIMENTS

In accordance with the invention, a non-linear counter or its generalized version which has a function of cascade accumulation is employed in the temperature measurement with a temperature sensor such as temperature measuring resistor and thermocouple.

Figure 1:
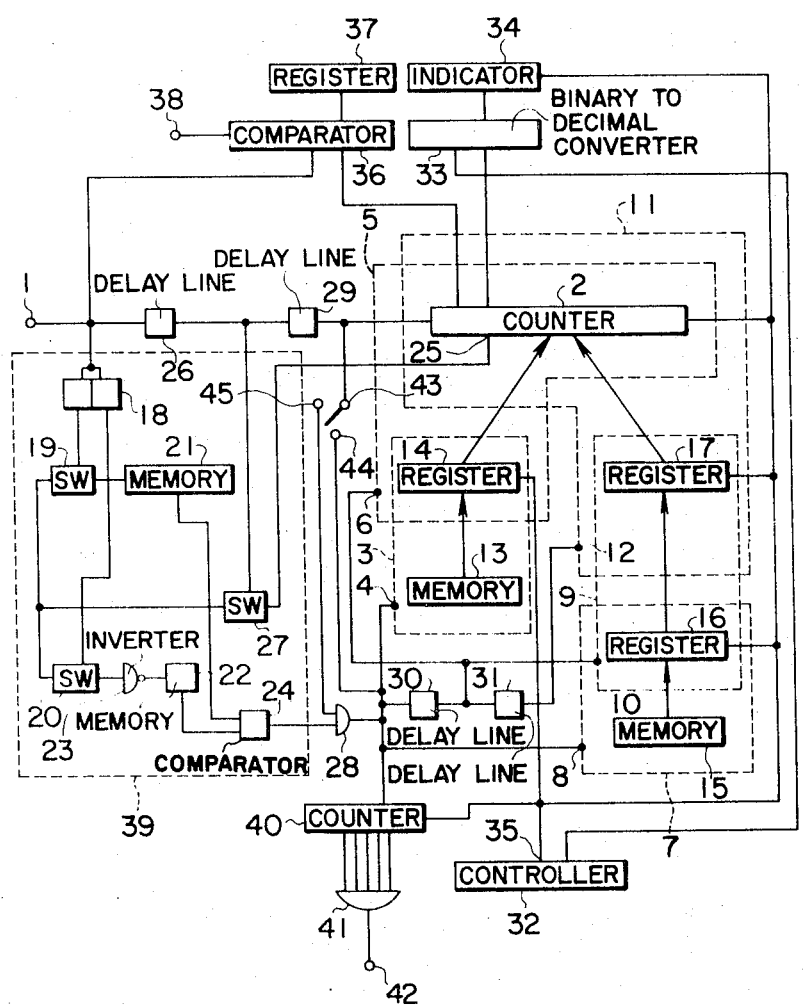
FIG. 1 is a block diagram showing an example of the nonlinear counter employed in accordance with the invention.

FIG. 1 shows a general form of one example of the nonlinear counter, which may be used in one of two operational modes, namely mode A and mode B, as will be described hereinafter in detail.

The operational mode A of the counter will first be described. In this operational mode, the elements enclosed within a dashed rectangle 39 and a gate 28 are held inoperative or omitted, and a switch 43 is thrown to a contact 44. Also, delay lines 26 and 29 may be short-circuited. External signal pulses are applied to a terminal 1 and coupled as inputs to a counter 2. Shown enclosed with a dashed rectangle 3 is an accumulating circuit including a memory 13 and register or accumulator 14. Upon application of an operation command pulse at a terminal 4, the contents of the memory 13 are non-destructively read out and added in the register or accumulator 14. The register or accumulator 14 and counter 2 also form an accumulating circuit, as shown enclosed with a dashed rectangle 5. Upon application of an operation command pulse at a terminal 6, the contents of the register or accumulator 14 are non-destructively read out and accumulated at the counter 2 by being added or subtracted.

The memory 13, register or accumulator 14 and counter 2, as will be noted, constitute a cascade accumulator, whose detailed circuit is typically shown in FIG. 2 and will be described hereinafter.

Enclosed with a dashed rectangle 7 is still another accumulating circuit which includes memory 15 and register or accumulator 16. Upon application of an operation command pulse at a terminal 8, the contents of the memory 15 are non-destructively read out and added in the register or accumulator 16. The register or accumulator 16 and another register or accumulator 17 also constitute another accumulating circuit, as shown enclosed with a dashed rectangle 9. In the presence of an operation command pulse at a terminal 10, the contents of the register or accumulator 16 are non-destructively read out and added to the register or accumulator 17. The register or accumulator 17 and counter 2 constitute a further accumulating circuit, as shown enclosed with a dashed rectangle 11. Upon application of an operation command pulse at a terminal 12, the contents of the register or accumulator 17 are non-destructively read out and accumulated either additively or subtractively in the counter 2. The memory 15, registers or accumulators 16 and 17 and counter 2 constitute a second cascade accumulator.

The external pulses applied at the terminal 1 are also transferred as operation command pulses through the closed contact 44 of the switch 43 to the terminals 4 and 8 and also through a delay line 30 to the terminals 6 and 10 and through another delay line 31 to the terminal 12 for the above consecutive accumulative operations in cascade.

With series of input pulses numbering P and applied to the terminal 1, while they are directly counted by the counter 2, the aforementioned cascade operations are concurrently executed P times consecutively. With $2c$ entered in the memory 13, for instance, the consecutive pulses lead to the following results:

| Consecutive pulse | Number of counted pulses by counter 2 | Acquired contents of register or accumulator 14 | Contents additively or subtractively entered from register or accumulator 14 into counter 2 |
|---|---|---|---|
| 1st | 1 | $2c \times 1$ | $2c \times 1$ |
| 2nd | 1 | $2c \times 2$ | $2c \times 2$ |
| ... | ... | ... | ... |
| Pth | 1 | $2c \times P$ | $2c \times P$ |

The contents of the register or accumulator 14 are arranged to be entered into the counter 2 upon application of each input pulse either additively or subtractively depending upon whether $c$ is a positive or negative number. Thus, if the cascade accumulator (3, 5) is solely considered, the number X to be acquired by the counter 2 after P consecutive input pulses is given as:

$$X = P + 2c(1 + 2 + \ldots) + P) = P + cP(P + 1)$$

(1)

If P is sufficiently large, equation (1) may be approximated as:

$$X = P + cP^2$$

(2)

Similarly, considering both the cascade accumulators (3,5) and (7, 9, 11) and with $6i$ given to the memory 15, $$X = P + cP^2 + iP^3$$

(3)

Likewise, if a further cascade accumulator having one more than the number of accumulator stages of the second cascade accumulator (7, 9, 11) is additionally provided, with $24l$ given to its memory, then, $$X = P + cP^2 + iP^3 + lP^4$$

(4)

Moreover, if the counter 2 is previously given a constant number S, a term of a constant value may be added to the right side of equation (2), (3) or like $$X = S + P + cP^2$$

(5)

Furthermore, it is possible to change the non-destructive memory contents, for instance $c$, $i$, etc., when a predetermined number of consecutive input pulses is reached. For example, in connection with equation 2, if $c$ is changed to $c_1$ when $P$ reaches $P_1$, then, $$X = P + cP^2 \text{ for } P<P_1$$

(6)

and $$X = P - cP_1^2 + 2cP_1P + c_1 (P-P_1)^2 \text{ for } P>P_1$$

(7)

Still further, again in connection with equation 2, if it is so arranged that the memory 13 is given 0 for $P<P_1$ and $2c$ at $P = P_1$, or alternatively, if we fix the memory contents to $2c$ and so arrange to have the pulses sent forth to the terminal 4 blocked for $P<P_1$ and permitted at $P = P_1$, then, $$X = P \text{ for } P>P_1$$

(8)

and $$X = P + c(P - P_1)^2 \text{ for } P>P_1$$

(9)

Similar procedure goes for third-order and fourth-order polynomials of P. More particularly, in connection with the registering of a predetermined count for input pulses being applied at the terminal 1, either the contents of memories 13, 15, etc. may be changed or command pulses delivered to terminals 4, 8, etc. may be controlled in a suitable manner.

The counter contents given as X is the above individual equations cannot change continuously since the number of input pulses is an integer. However, it is possible to change X practically continuously by appropriately selecting the scale factor. Appropriate selection of the scale factor also enables reducing the error due to the difference between equations (1) and (2). For example, multiplication of equation (2) gives $$nX = nP + c/n \ (nP)^2$$

(10)

It will be seen from this equation that with $c/n$ substituted for $c$ and with $n$ times $P$ for $P$, a fraction of the value indicated by the counter 2 may be read with $n$ as denominator. For example, if $n = 100$, the contents of the counter 2 may be converted through a binary-to-decimal converter 33 under the control of a controller 32 into a corresponding decimal number, which may be displayed at an indicator 34, and whose 1/100 fraction may be read. Numeral 35 designated a clear terminal of the controller 32.

The cascade accumulation system described above may be realized either with static circuits or with dynamic circuits.

Figure 2:
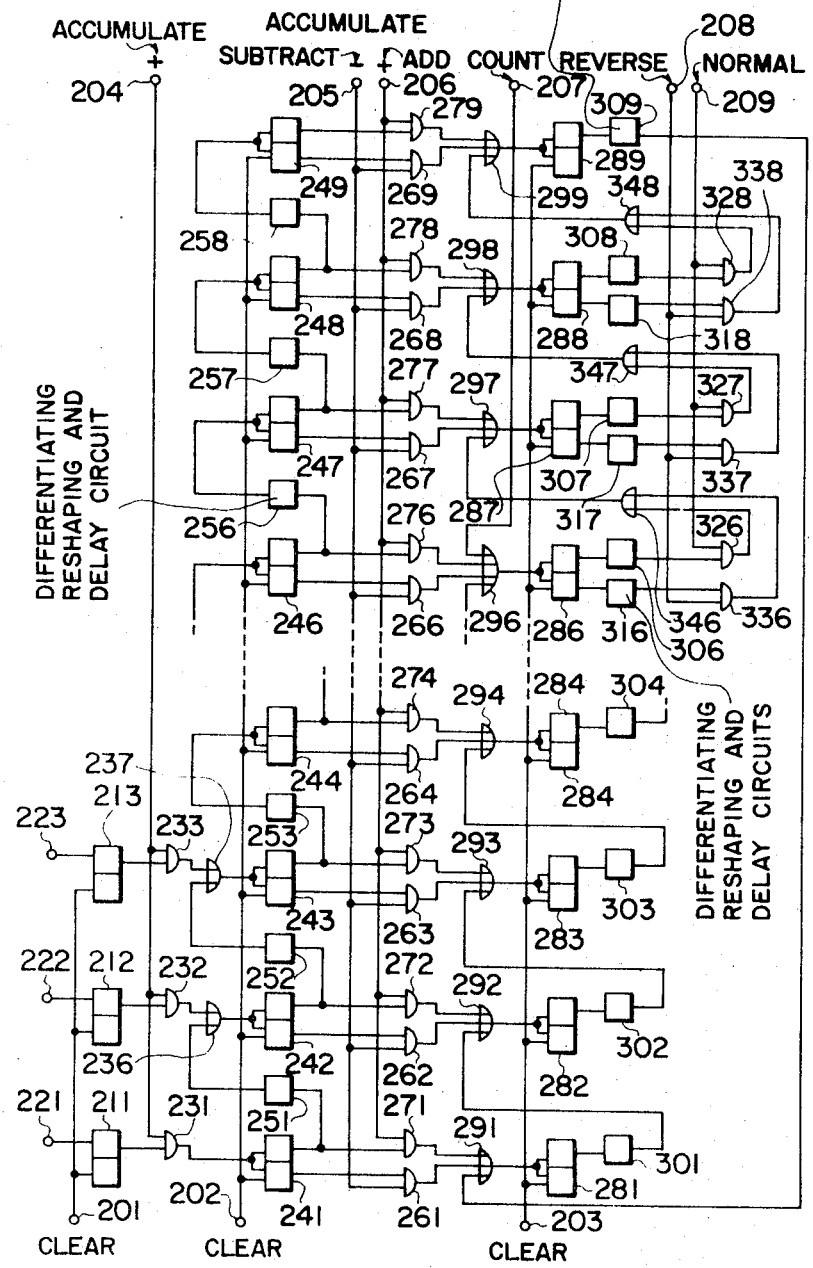
FIG. 2 is a detailed diagram showing a cascade accumulator section in the circuit of FIG. 1.

FIG. 2 shows a static circuit example of part of the cascade accumulator circuitry shown in FIG. 1. In FIG. 2, numerals 211 to 213 designate flip-flops constituting a memory. They are cleared with a signal pulse applied to a clear terminal 201 and adapted to remember or store signal pulses applied to respective terminals 221 to 223. Numerals 241 to 249 designate T-type flip-flops constituting a register or accumulator. Upon application of a command pulse at a terminal 204, the contents of the memory (211 to 213) are non-destructively read out and accumulatively stored into the register or accumulator (241 to 249). Differentiating, reshaping and delaying circuits 251 to 258 are provided for carries. Numerals 281 to 289 designate T-type flip-flops constituting a counter, with the flip-flop 286 for the $2^0$ position bit. Input pulses applied to a terminal 207 are counted by the counter. In addition, upon appearance of a command pulse at a terminal 206, the contents of the register or accumulator (241 to 249) are non-destructively read out and accumulatively added in the counter. At this time, gates 326 to 328 are held open by impressing a signal on a terminal 209, thereby permitting carries through differentiating, reshaping and delaying circuits 301 to 308. On the other hand, upon application of a command pulse at a terminal 205, the 1's complements of the contents of the register or accumulator (241 to 249) are non-destructively read out and entered in the counter (281 to 289), with the end-around carry from the most significant bit brought through a differentiating, reshaping and delaying circuit 309 into the least significant bit position 281, thus effecting an accumulative subtraction. For borrows to be permitted through differentiating, reshaping and delaying circuits 316 to 318 to the next position, gates 336 to 338 are opened by impressing a signal on a terminal 208. In this manner, reverse counting of input pulses applied to the terminal 207 is effected through portion (286 to 289) of the counter. Numerals 202 and 203 designate clear terminals of the register or accumulator and counter, respectively.

As is described, the circuitry of FIG. 2 functions as a two-stage cascade accumulator, with its integral figure section also serving as a reversible counter. Although the FIG. 2 circuit includes only a single intermediate accumulator stage between memory and counter, two or more intermediate accumulator stages may be provided to obtain the circuit of FIG. 1 and circuits for deriving higher degree polynomial functions of $P$ like equation (4). In case conventional serial addition is used for the accumulative operation, a single pulse is generated in each cascade operation. Its pulse number is designated as P. Also, in this case, a single adder may be commonly used.

Figure 3:
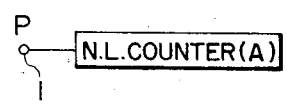
FIGS. 3 and 4 are symbolic representations of mode A nonlinear counters.

FIG. 3 shows a symbol representing a mode A nonlinear counter labeled thus to be used hereafter, which signifies that the value of X in equations (2), (3), (4), etc. may be derived for P pulses applied to terminal 1 or generated for the corresponding number of cascade operations.

Figure 4:
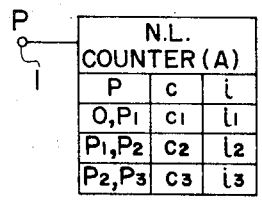

FIG. 4 shows a symbol representing another mode A nonlinear counter NLCA, in which the non-destructive contents of memories 13 and 15 (FIG. 1) are changed in the course of counting pulses. The underlying table indicates that the memories 13 and 15 are given respectively as $2c_1$ and $6i_1$ for $0<P<P_1$, $2c_2$ and $6i_2$ for $P_1<P<P_2$, and $2c_3$ and $6i_3$ for $P_2<P<P_3$.

Figure 5:
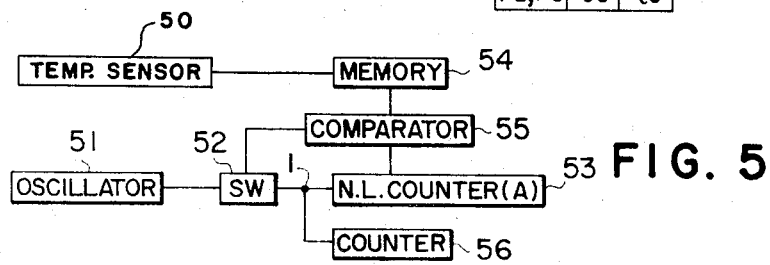
FIG. 5 is a block diagram showing an embodiment of the measuring circuit using a mode A non-linear counter according to the invention.

FIG. 5 shows a circuit for deriving the value of $P$ for a value $X_1$ given as $X$. In the FIG. 5, numeral 51 designates an oscillator, numeral 52 identifies an electronic switch controlled with the output of a comparator 55, numeral 53 referes to a mode A non-linear counter such as the one shown in FIG. 4, and numeral 56 identifies a counter. When $X_1$ is stored in a memory 54, the output of the oscillator 51 is delivered through switch 52 to mode A non-linear counter 53 and counter 56 to be countd thereby. The switch 52 is turned off with an output procedure by the comparator 55 when the significant figure of the contents of the mode A non-linear counter 53 coincide with the contents of a memory 54. In this manner, the value of $P$ for $X_1$ given as a value of $X$ in equations (2), (3), (4), (9), etc. may be derived. In many practical cases, the valiue of the coefficients $c, i, l$, etc. may be made desirably small by appropriately selecting the scale factor, so that the number additively or subtractively manipulated from registers or accumulators, 14, 17, etc. to counter 2 (FIG. 1), upon each pulse, may be made sufficiently smaller to take the integral figure of the contents of the mode A non-linear counter as the above-mentioned significant figure.

Now, the use of the non-linear counter of FIG. 1 in the operation mode B will be discussed. In the mode B operation, the switch 43 is thrown to a contact 45, and the delivery of operation command pulses is controlled in accordance with the output of the circuit within the dashed + 39. In the delay lines 26 and 29 are also used. The circuit within the dashed rectangle 39 controls the gate 28 to open or close so as to permit or interrupt command pulse according to the detected change of the $2^0$ position bit in the counter 2. With consecutive input pulses appearing at the terminal 1, a T-type flip-flop 18 is driven into alternate states to turn on switches 19 and 20 alternately. Meanwhile, each input pulse is passed through the delay line 26 to a switch 27 to turn it on during the delayed pulse interval, during which time the content of the $2^0$ position bit 25 in the counter 2 is written through the on-state one of the switches 19 and 20 in either onebit memory 21 or 22. The information from the switch 20 is transferred through an inverter 23 to the memory 22. Thus, if, and only if, the content of of the $2^0$ position bit 25 of the counter 2 upon appearance of one pulse at terminal 1 is not the same as at the time of the previous one, the contents of the memories 21 and 22 coincide, causing the comparator 24 to provide an output signal to the gate 28 so that a pulse having been passed through the delay line 29 and closed contact 45 of the switch 43, is permitted through the gate 28 and impressed as command pulse upon the terminals 4, 6, 8, 10 and 12 of the accumulating circuits comprising respective memories and registers or accumulators and counter for respective operations of cascade accumulation.

The operation in this mode is similar to that in the aforedescribed mode A counter, but in the case of the mode B non-linear counter, however, the contents of the registers or accumulators 14, 17, etc. are subtractively entered in the counter 2 when the numbers $2c$, $6i$, $24l$, etc. given to the memories 13, 15 and so forth, are positive, while they are additively entered in the counter 2 when they are negative, and positive numbers $-2c, -6i, -24l$, etc. are given to the memories 13, 15 and so forth. It will be apparent that this can be achieved with the circuit of FIG. 2.

It the cascade accumulator (3, 5) is solely considered, with $X_p$ as the current counter contents for $P$ pulses applied to the terminal 1, the contents of the register or accumulator 14 are $2cX_p$, which is the result of accumulation of the contents of the memory 13 read out every time the $2^0$ position digit of the counter 2 changes by 1. With subsequent n pulses ($n$ being a small number) applied to the terminal 1, the counter 2 counts $n$, while the contents of the register or accumulator 14 are subtracted $X_{p+n} - X_p$ times from the counter 2. This can be expressed as:

$$X_{p+n} - X_p = n - 2cX_p(x_{p+n} - X_p)$$

(11)

or in a differential form as:

$$\Delta X = \Delta P - 2cX \Delta X$$

(12)

Then, by integrating the variable $X$ from the first to the $p$th pulse, $$P = X + cX^2$$

(13)

Likewise, mode B non-linear counters for higher degree polynomial functions of $X$ such as:

$$P = X + cX^2 + iX^3$$

(14)

$$P = X + cX^2 + iX^3 + lX^4$$

(15)

and the like can be obtained.

Considering equations (12) and (13), it will be seen that the non-linear counter of this mode is effected by adding or subtracting consecutive values which are each proportional to the product of the current count $X$ and the increment $\Delta X$ in the counter corresponding to the increment $\Delta P$ in the number of external pulses. In case of a third-order polynomial function like equation (14), consecutive values which are each proportional to the product of the square of the current count and the incremental value of count are additionally added or subtracted. Similar processing may be used for still higher order polynomials. More particularly, the cascade accumulation is done a number of times proportional to the increment $\Delta X$ in the counter for each external pulse.

The circuit of FIG. 1 is used only where $X_{p+1} - X_p$ for a single external pulse is less than 2 and the change of $X$ with change of $P$ is monotonic. This circuit is used satisfactorily in many practical occasions. But where this circuit is insufficient due to the fact that the value of $X$ may change by 2 or more with a single input pulse, the operation control circuit 39 in FIG. 1 may be modified accordingly. In connection with equations (34), (36), (41), (47) and (48) described hereinafter, the value of $T$ which corresponds to $X$ above will not change by 2 or more with a single input pulse, but in connection with equations (26), (53) and (55) also described hereinafter a change of less than 3 may occur with a single input pulse.

Figure 28:
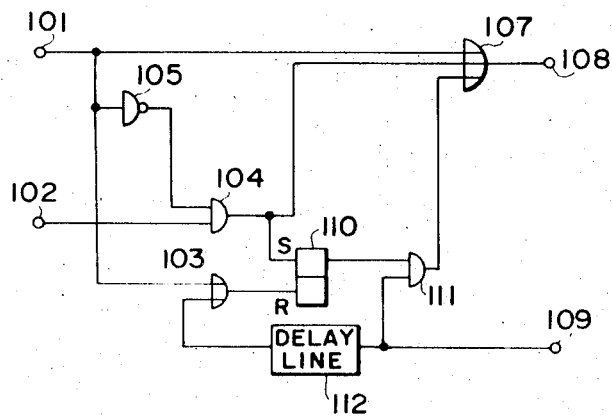
FIG. 28 is a schematic diagram showing a circuit for controlling the cascade accumulation of a non-linear counter embodying the invention.

FIG. 28 shows an operation control circuit which may be used even for the latter case. In this case, if the change in the integral figure part of $X$ with a single input pulse is 0, no change occurs in $2^0$ and $2^1$ position binary digits; if the change is 1, a change always takes place in the $2^0$ position; and if the change is 2, the $2^0$ position digit does not change but a change occurs in the $2^1$ position. Referring to FIG. 28, the output of the gate 28 controlled by the output of the circuit 39 detecting a change in the $2^0$ position bit of the counter 2 in FIG. 1 is coupled to a terminal 101. A similar pulse output produced by detecting a change in the $2^1$ position through a circuit similar to the circuit 39 is impressed on a terminal 102. Thus, when a change occurs in the $2^0$ position, a pulse is passed through a gate 107 to a terminal 108. By applying this pulse as an operation command pulse in place of the output of the gate 28 (FIG. 1), an operation corresponding to a change in the integral part of X by 1 may be effected. By connecting terminal 109 of FIG. 28 to terminal 12 of FIG. 1, upon appearance of a pulse at the terminal 102 as a result of detecting a change in only the $2^1$ position, it is passed through the gate 107 to cause the same operation as at the time of the change in the $2^0$ position. In addition, an output from a gate 104 sets a flip-flop 110 to open a gate 111, whereby any pulse appearing at the terminal 109 may be passed through the gates 111 and 107 to the terminal 108 to repeat the above operation once again. The pulse appearing at the terminal 109 is also passed through a delay line 112 to the reset side of the flip-flop 110, so that the above operation is repeated only twice. In this manner, the operation is executed for a change in $X$ by 2 at once. Further, it is possible to construct operation control circuits which even take care of greater changes in $X$ than 2. Similar to the previous case of mode A counter, the scale factor may be appropriately selected to precisely satisfy the relations of equations (13), (14), (15), etc.

Also, similar to the previous mode A case, the count $X$ of the counter 2 may be converted through the binary-to-decimal converter 33 into a decimal number for display at the indicator 34. In this case, the display may also be obtained by the count of a counter 40 counting the output pulses of the gate 28 or gate 107 in FIG. 28. Insofar as the practical applications of the invention are concerned, the count of the counter 2 always increases upon application of each external pulse, if the effective figure in the counter 2 does not change by 2 or more at once, in order to obtain pulses for causing a change in the numbers contained in memories 13, 15, etc. upon reaching of a predetermined value of the count or to obtain pulses for controlling the delivery of command pulses to terminals 4, 8, etc., the predetermined value may be previously given to a register 37 for comparison with the current contents of the counter 2 in a comparator 36 to produce a coincidence pulse at terminal 38. Alternatively, content bits of the counter 40 corresponding to the individual bits of the predetermined value may be transferred to an AND gate 41 so as to use the output thereof available at a terminal 42.

For example, in the case that a signal pulse is applied at terminal 1 upon initially giving $2C_1$ into the memory 13 and then $2C_1$ in the memory 13 is changed to $2C_2$ by a signal pulse being generated at the terminal 42 upon reaching of $X$ to $X_1$, the functions $P$ are given as the quadratic polynomial, $$P = X + c_1 X^2 \text{ for } X < X_1 \qquad (16)$$

and $$P = -c_1 X_1^2 + (1+2c_1 X_1)X + c_2(X - X_1)^2 \text{ for } X > X_1 \qquad (17)$$

The function $P$ in these equations (16) and (17) and the derivative thereof are continuous at $X = X_1$ and provide a smooth curve. In this manner, the output from the terminal 42 may be used to appropriately control the delivery of command pulses to the terminals 4 and 8 or change the contents of the memories 13 and 15 so as to obtain a smooth curve closely approximating the intended curve. Similar arrangements may be taken for higher order polynomials of X. Such change of contents of memories or control of cascade accumulation may also be performed in accordance with the number of pulses $P$.

Figure 6:
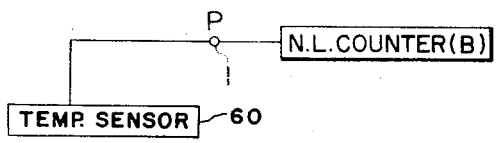
FIGS. 6 to 10 are symbolic representations of mode B nonlinear counters.

FIG. 6 shows a mode B non-linear counter in which the value of $X$ for $P$ pulses applied to terminal 1 can be derived.

Figure 7:
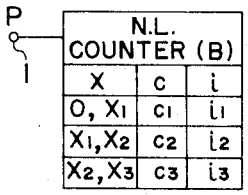

FIG. 7 shows another mode B non-linear counter, and the underlying table indicates that c and i are respectively equal to $c_1$ and $i_1$ for $0<X<X_1$, $c_2$ and $i_2$ for $X_1<X<X_2$, and $c_3$ and $i_3$ for $X_2<X<X_3$. The operation brought about by the pulse appearing at the terminal 6 (FIG. 1) is subtractive if c is positive, while the operation is additive if c is negative. The same holds for i.

Figure 8:
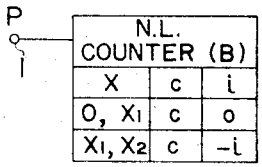

FIG. 8 shows a further mode B non-linear counter, whose behavior is given as:

$$P = X + cX^2 \text{ for } 0<X<X_1 \qquad (18)$$

and $$P = X + cX^2 - i(X - X_1)^3 \text{ for } X_1 < X < X_2 \quad (19)$$

Considering now an equation $$P = S + X + cX^2 \quad (20)$$

Equation (20) can be rearranged as $$P - S = X + cX^2.$$

Figure 9:
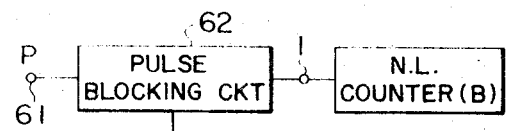

FIG. 9 shows a counter for deriving $X$ in equation (20). In this circuit, $P$ pulses applied to a terminal 61 minus S pulses blocked by a circuit 62 appear at terminal 1.

Figure 10:
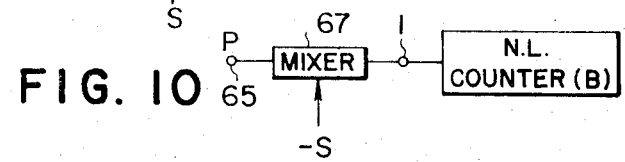

FIG. 10 shows another counter, which may be used where $S$ is negative. In this circuit, P pulses applied to a terminal 61 are added $-S$ pulses by a mixer 67. The subtraction or addition of $S$ to $P$ pulses as in the circuit of 9 or 10 may be realized with application of a pre-set counter.

Figure 11:
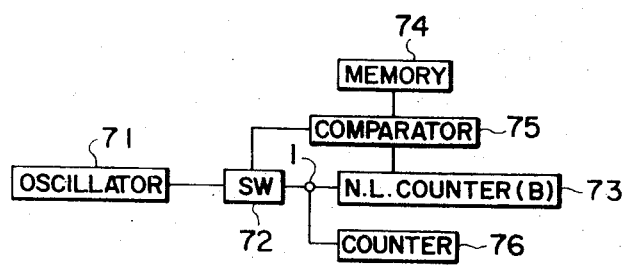
FIG. 11 is a block diagram showing an embodiment of the measuring circuit using a mode B non-linear counter according to the invention.

FIG. 11 shows a circuit for deriving the value of $P$ corresponding to a given value $X_0$ of $X$. In FIG. 11, numeral 71 designates an oscillator, numeral 72 identifies an electronic switch countrolled with the output of a comparator 75, numeral 73 refers to a mode B non-linear counter like that of FIG. 7, and numeral 76 identifies a counter. The output pulses of the oscillator 71 are delivered through switch 72 to mode B counter 73 and counter 76 to be counted thereby. The switch 72 is turned off with an output produced by the comparator 75 when the significant figure of the contents $X_0$ of the mode B non-linear counter 73 coincide with the contents of a memory 74. By so arranging, the value of $P$ corresponding to value $X_0$ of $X$ in equations (13), (14), (15), (16), (17), (18), (19), etc. may be derived. As to the position of bits of the significant figure, the same description as has previously been described in connection with the mode A counterpart applies.

Comparison of the results obtainable with the circuits of FIGS. 5 and 11 will make it apparent that either mode A or mode B non-linear counter may be employed to the same end. With FIG. 5 circuit, a value of $P$ for any given value of $X$ ; in equations (2), (3), (4), (6), (7), (8), (9), etc. may be derived, which corresponds to deriving a value of $X$ in equations (13), (14), (15), (16), (17), (18), (19), etc. for any given value of $P$ by using the circuit of FIG. 7. For the FIG. 11 circuit, a corresponding function may be obtained by using the circuit of FIG. 4.

While most examples disclosed below for obtaining the temperature value are based on the mode B non-linear counter, it would be apparent that the temperature value may also be obtained by using the mode A non-linear counter. The essential difference between the case of using a mode A non-linear counter and the case of using a mode B non-linear counter resides in that in the B mode case the signal from a temperature sensor is converted through an analog-to-digital converter such as a digital voltmeter into a train of pulses corresponding in number to the signal level obtained by a sensor to be coupled to a mode B counter, while in the case of using a mode A counter the signal from a sensor is compared either digitally or as an analog value with the count of a mode A counter to determine the temperature value in terms of the number of consecutive accumulative operations executed until the two comparator inputs coincide.

An embodiment of the invention applied to the temperature measurement using the mode A or mode B non-linear counter discussed above and a temperature measuring resistor as temperature sensor will now be given.

According to the International Practical Temperature Scale established in 1948 (hereinafter referred to as IPTS-48), any temperature $T$ between 0°C and 630.5°C is given as:

$$R = A_r + B_r T + C_r T^2 \quad (21)$$

where $R$ is the resistance of a platinum wire resistance thermometer, and $A_r$, $B_r$ and $C_r$ are constants. Also, any temperature T between 630.5°C and 1,063°C is given as:

$$E = A_j + B_j T + C_j T^2 \quad (22)$$

where $E$ is the thermal electromotive force induced in a standard thermocouple of platinum and platinum-rhodium alloy with the cold junction thereof held at 0°C, and $A_j$, $B_j$ and $C_j$ are constants. The electric signal from the aforementioned thermometer or thermocouple (hereinafter assumed to be a voltage signal) may be processed in a linear electric circuit into a signal $V$ given as:

$$V = A + T + CT^2 \quad (23)$$

Figure 12:
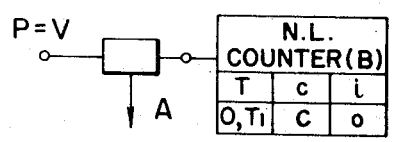
FIG. 12 is a schematic representation of a general circuit for temperature measurement using a mode B non-linear counter.

By the comparison of equation (23) with equation (20), it will be seen that a value of temperature $T$ corresponding to the value of voltage $V$ may be directly derived in mode $B$ non-linear counter by converting the voltage $V$ into a corresponding number of pulses and applying the pulses thus obtained to a circuit as shown in FIG. 12.

In FIG. 12, $T_1$ in the underlying table represents the upper limit of the measurable temperature range. The conversion of the voltage $V$ into the numerically coreesponding number of pulses may be obtained extremely accurately and precisely by the technique of digital voltmeters. Also, by previously adjusting the voltage V to a suitable level through a linear circuit, for instance through an amplifier or means to integrate $V$ for a predetermined time, it is possible to directly use a pulse train obtained from a digital voltmeter to obtain this measurement. To this end, the principles of various kinds of digital voltmeters may be applied. This is because, so long as the voltage is obtained in a digital form, a train of pulses proportional in number to the voltage may be obtained by means of reading out the measured value. The proportionality constant may be selected to a desired value by previously adjusting the level of V as mentioned earlier. The digital voltmeters especially suited to this end include one of voltage-time conversion type using ramp voltage and one of integrating type dual slope. With these digital voltmeters, a pulse train produced in the course of obtaining a digital display may be used to the end of this measurement, and the digital voltmeters employed in the following examples are assumed to convert a voltage into a train of pulses proportional in number to the voltage level.

A specific numerical example will now be given. Table 7 in JIS (Japanese Industrial Standards) C-1604 lists ratios of the resistance of the platinum temperature measuring resistor (hereinafter abbreviated as $P_t$) at various temperatures, to the resistance thereof at 0°C. According to this table, the relation of equation (21) precisely holds for a temperature range between 0°C and 630°C. In this range, the resistance $R_t$ of $P_t$ which offers a resistance of 100 ohms at 0°C is a function of temperature $T_r$ given as:

$$R_t = 100 + 0.397,463 T_r - 0.000,058,766 T_r^2 \quad (24)$$

If a current of 1mA is caused through $P_t$, its output voltage $E_r$ is:

$$E_r = 100,000 + 397.463 T_r - 0.058,766 T_r^2 (\mu V) \quad (25)$$

Dividing this equation by 397.463, $$E_r/397.463 - 251.59 = T_r - 0.000,147,85 T_r^2 \quad (26)$$

From comparison of this equation with equation (20), it will be seen that by setting $$P_r = E_r/397.463 \quad (27)$$

$$S_r = 251.59 \quad (28)$$

and $$c_r = -0.000,147,85 \quad (29)$$

Figure 13:
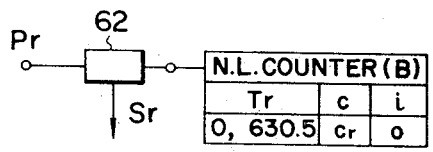
FIGS. 13 and 14 are schematic representations of temperature measuring systems using a temperature measuring resistor embodying the invention.

$T_r$ may be derived by the circuit shown in FIG. 13.

In this case, since $S_r$ is preferably an integer, the scale factor is set to 100, giving $$-2c_r/100 = 0.000,002,957 \quad (30)$$

to the memory 13 in the circuit of FIG. 1 for the additive accumulation of the contents of the register or accumulator 14 in the counter 2 according to the operation command pulse given to the terminal 6. Pulses proportional in number to $E_r$ are produced by a digital voltmeter, which counts 100 for every 397.463 $\mu V$, and given to the terminal 1. By so doing, $100 T_r$ will be derived from the counter 2, which may be divided by 100 to obtain the value of $T_r$. In no such high precision of measurement is required, the scale factor of unity may be used by rounding the bits below the decimal point of the value in equation (28). Also, by previously multiplying $E_r$ in equation (25) by 1,000,000/397,463, the measurement to the scale factor of 100 may be made by using the usual form of digital voltmeter counting 100 for every 1mV.

While in the above example the current caused to pass through $P_t$ is selected to 1mA; where the required precision is not so strict, the current through $P_t$ may be set to, for instance, 10mA by allowing slight selfheating.

Also, it is possible to use a voltage obtained through a resistance-to-voltage converter in proportion to the resistance of $P_t$ or to use the voltage proportional to the change of resistance of $P_t$ with respect to temperature. With such voltage, the value of $T_r$ may be derived in the same way. In the latter case, $S_r = 0$, so that the circuit 62 in FIG. 13 may be dispensed with, as well as eliminating the need to select the scale factor to a suitable value to substitute an integer for the value of $S_r$.

Next, measurement of temperatures below 0°C will be discussed. According to IPTS-48, any temperature T between −182.97°C and 0°C is defined as:

$$R = R_0[1 + AT + BT^2 + C(T - T_{100})T^3] \quad (31)$$

where $R$ is the resistance of a platinum wire resistance thermometer, and $R_0$ is the resistance thereof at 0°C. Comparison of this equation with equation (21) shows that the following relations are established:

$$R_0 = A_r, \; R_0 A = B_r, \text{ and } R_0 B = C_r \quad (32)$$

$T_{100}$ is 100°C. The factor $C$ is obtained from the resistance of $P_t$ at −182.97°C. According to the table 7 of JIS C-1604, equation (31) reduces to:

$$R = R_0[1 + 0.003,974,63T - 0.000,000,587,66T^2 - 3.49 \times 10^{-12}(T-100)T^3] \quad (33)$$

Substituting $T_-$ for $-T$ since $T$ this time is negative, and rearranging equation (33), we obtain:

$$1,000/3.97463 \, (1 - R/R_0) = T_- + 1.478,53 \times 10^{-4} T_-^2 + 0.878,07 \times 10^{-7} T_-^3 + 0.878,07 \times 10^{-9} T_-^4 \quad (34)$$

Figure 14:
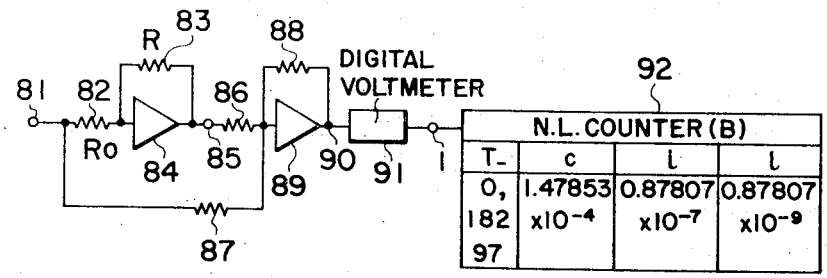

FIG. 14 shows an example of the circuit for deriving the value of $T_-$ in equation (34). In the FIG. 14, resistance $R_0$ is provided by resistor 82, and resistance $R$ by resistor 83. Numeral 84 designates an operational amplifier which constitutes a resistance-to-voltage converter. Numeral 89 is an operational amplifier which, together with same resistors 86, 87 and 88, constitutes a summing amplifier. Thus, with a voltage of a value 1000/3.974,63 applied to a terminal 81, a voltage of the same absolute value as the left side of equation (34) but of the opposite sign is available at a terminal 90. This voltage is converted through a digital voltmeter 91 into a corresponding number of pulses, which are applied to mode B non-linear counter 92 for deriving the value of $T_-$ in equation (34). The voltage applied to the terminal 81 may not necessarily be of the aforementioned value, but its value may be determined by the proportionality constant of the voltage-to-pulse number conversion of the digital voltmeter. In other words, it is necessary only to arrange such that the digital voltmeter 91 produces 1000/3.974,63 pulses when a voltage corresponding to $R = 0$, i.e., the voltage applied to the terminal 81, is directly impressed on the terminal 90. As for the scale factor, the same thing as has been discussed previously applies.

While the above examples have been concerned with the use of a platinum temperature measuring resistor conforming to the JIS standards, it will be apparent from the IPTS definitions that essentially the same principles apply to temperature sensors following other standards.

Now another embodiment of the invention applied to the temperature measurement using a thermocouple will be given.

According to table 9 of JIS C-1602 the standard thermoelectromotive force $E_j$ induced in a standard thermocouple of platinum and platinum-rhodium alloy (hereinafter abbreviated as PR) at any temperature $T_j$ between 630.5°C and 1,063°C is expressed as:

$$E_j = -338.7 + 8.387,8T_j + 0.002,422,2T_j^2 (\mu V) \quad (35)$$

Dividing this equation by 8.387,8 and rearranging, we have $$E_j/8.387,8 + 40.38 = T_j + 0.000,288,78T_j^2 \quad (36)$$

It will thus be seen that by setting $$P_j = E_j/8.387,8 \quad (37)$$

$$S_j = 40.38 \quad (38)$$

and $$c_j \: 0.000,288,78 \quad (39)$$

Figure 15:
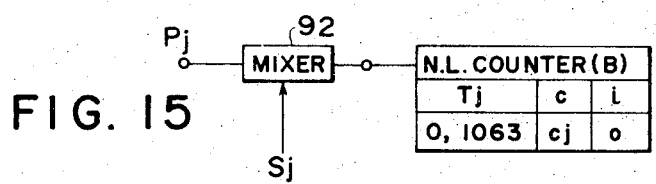
FIGS. 15, 16 and 18, and FIG. 17, illustrate a temperature measuring system using a P-R thermocouple embodying the invention, and a graph showing the waveforms of the measurement, respectively.

$T_j$ may be derived by the circuit shown in FIG. 15.

More particularly, the output of PR is converted through a digital voltmeter counting 1 for every 8.387,88$\mu$V into a corresponding number of pulses, which are applied in addition to $S_j = 40.38$ to the mode B non-linear counter to derive the corresponding value of $T_j$. Again in this case, by setting the scale factor to 100 the value of $S_j$ is multiplied by 100 into an integer. Also, by previously multiplying $E_j$ by 100/8.387,8 and setting $c_j = 0.000,002,887,8$ a series of pulses proportional in pulse number to 100/8.387,8 times $E_j$ may be produced from a digital voltmeter, which counts 100 for every 100$\mu V$, and applied to the input labeled $P_j$ in FIG. 15, thereby deriving 100$T_j$. Further, the term $S_j$ may be eliminated by coupling $E_j$ to a suitable summing amplifier.

Now a measurement of a higher temperature range using PR will be discussed. The temperature character of PR up to a temperature of 1,700°C, is defined in table 9 of JIS C-1602, and for a range between 978°C and 1,600°C a relation:

$$E_j = -338.7 + 8.3878T_j + 0.002,422,2T_j^2 \\ -0.000,002,32(T_j - 978)^3 \: (\mu V) \quad (40)$$

holds sufficiently precisely. Dividing this equation by 8.3878 and rearranging, we have:

$$E_j/8.387,8 + 40.38 = T_j + 0.000,288,78T_j^2 \\ -0.000,000,276,5(T_j - 978)^3 \quad (41)$$

Thus, it will be seen that by setting $$P_j = E_j/8.387,8 \quad (42)$$

$$S_j = 40.38 \quad (43)$$

$$c_j = 0.000,288,78 \quad (44)$$

$$i_j = -0.000,000,276,5 \quad (45)$$

and $$T_j = 978 \quad (46)$$

Figure 16:
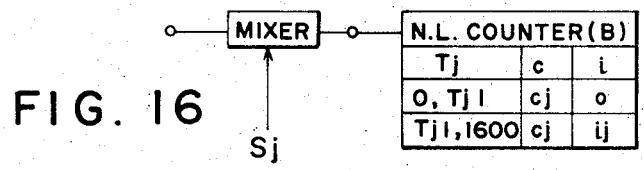

$T_j$ may be derived by the circuit shown in FIG. 16.

The third term on the right side of equation (41) has no appreciable effect where $T_j$ is between 978°C and 1,063°C. Thus, the circuit of FIG. 16 may be used for sufficiently precise temperature measurement where the temperature of PR is in a range between 630.5°C and 1,600°C. Similar to the preceding embodiment, the scale factor may be suitably selected, or $E_j$ may be multiplied by a suitable factor to enable using the pulse train obtainable from an ordinary digital voltmeter.

Now, the invention will be described in connection with the aspect of the correction in the measurement of low temperature using PR.

While equation (35) for the thermoelectromotive force in PR based on the JIS standards holds accurately down to a temperature of 500°C, errors will become appreciable for lower temperatures. In order to compensate such errors for lower temperatures, equation (36) is modified by substitution of equations (37), (38), (39) into:

$$P_j + S_j(1 - e^{-P_j/74.07}) = T_j + c_j T^2 \quad (47)$$

Equation (47) approximately holds for lower temperatures down to the neighborhood of 0°C, as well as for higher temperatures. Moreover, to extend the upper limit of temperature coverage free from error while providing for the above compensation, equation (41) by substitution of equations (42), (43), (44), (45), (46) is modified into a similar form $$P_j + S_j(1 - e^{-P_j/74.07}) = T_j + c_j T_j^2 + i_j(T_j - T_j^{\:})^3 \quad (48)$$

This equation precisely represents the temperature characteristic of PR over a temperature range between 0°C and 1,600°C. Its third term on the right side, however, is replaced with 0 for $T_j < T_j^{\:}$. In this manner, PR may be used over the temperature range extending from 0°C to 1,600°C.

The electric circuit to take care of the low temperature compensation term $e^{-P_j/74.07}$ in equation (48) may be readily realized by so arranging that the pulse train constituting $P_j$ has a constant pulse frequency. By so doing, the compensation term can be given as an exponential function of time. Denoting the pulse frequency of the pulse train constituting $P_j$ by $f$ and the time interval of the pulse train by $t_j$, $$P_j = f t_j \qquad (49)$$

Then, the left side of equation (48) becomes:

$$f t_j + S_j(1 - e^{-f t_j/74.07}) = T_j + c_j T_j^2 + i_j(T_i - T_j)^3 \qquad (50)$$

Figure 17:
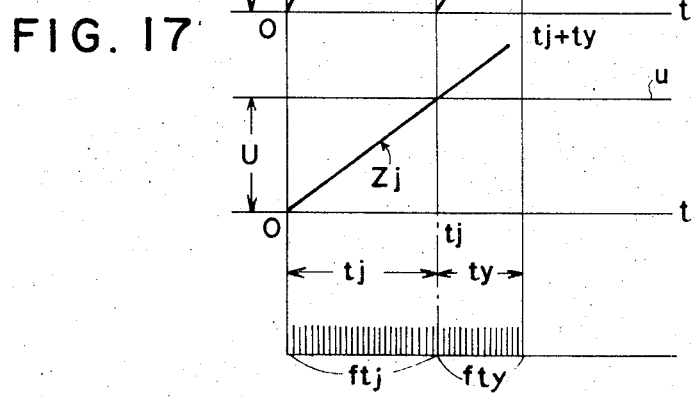

FIG. 17 illustrates a form of implementation of the process for deriving the value $T_j$ of formula (50). For the term $f t_j$ a ramp voltage $Z_j$ is generated, and the time $t_j$ corresponding to the intersection of the slope of this voltage and a line parallel to time axis t and representing a voltage U proportional to $E_j$ is determined to find the number of pulses $P_j = f t_j$ by means of gating pulses of frequency $f$ during this time. The magnitudes of $U$, frequency $f$ and slope of the ramp voltage $Z_j$ are so determined that one pulse is obtained for each 8.387,8$\mu V$ of magnitude of $E_j$. Meanwhile, an exponential voltage $F$, $$F = W(1 - e^{-ft/74.07}) \qquad (51)$$

Ultimately reaching $W$ proportional to $S_j$, is generated simultaneously with the ramp voltage $Z_j$, and F is sampled at instant $t_j$, at which time a ramp voltage $Z_y$ is generated. Then, the number of pulses $f t_y$ gated during the time from instant $t_j$ until a point corresponding to the intersection of the slope of the ramp voltage $Z_y$ and a line representing the sampled and held voltage $Y$ is found. The slope of $Z_y$ is preset such that the number of pulses obtained during the time from its generation until an instant corresponding to its intersection with the level line $W$ is equal to $S_j$. By summing $ft_y$ and $ft_j$ the pulse number given by equation (50) is obtained.

Figure 18:
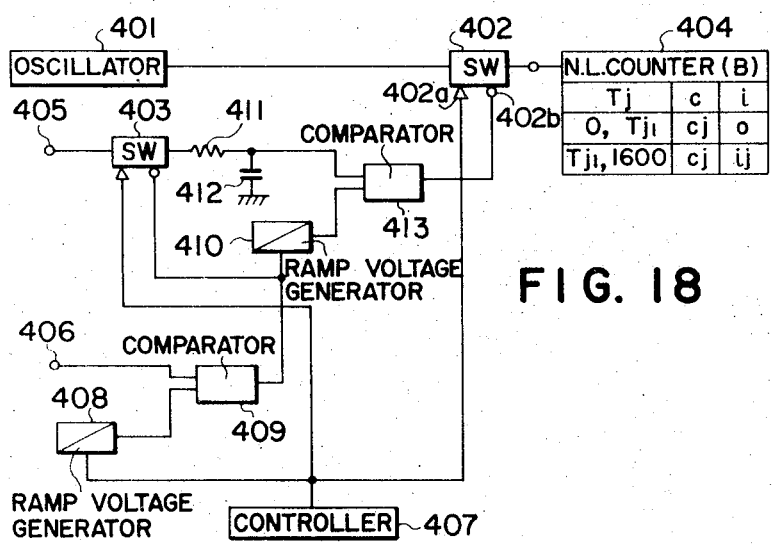

FIG. 18 shows a circuit for deriving the value of $T_j$ in equation (50) and involving the aforedescribed compensation process. In FIG. 18, numeral 401 designates a pulse oscillator of frequency $f$, and numerals 402 and 403 refer to switches turned conductive by a signal appearing at a terminal marked with a triangle 402a and turned nonconductive with a signal appearing at a terminal marked with a circle 402b. A resistor 411 and a capacitor 412 constitute an exponential voltage circuit with a time constant of 74.07/$f$. Numeral 404 designates the same mode B non-linear counter as shown in FIG. 16. Numerals 408 and 410 designate ramp voltage generators for $Z_j$ and $Z_y$ shown in FIG. 17 respectively, and numerals 409 and 413 refer to voltage comparators. The voltage $W$ proportional $S_j$ is applied to a terminal 405, and the voltage $U$ proportional to $E_j$ to a terminal 406. When the switches 402 and 403 are turned on and the ramp voltage generator 408 is started at $t = 0$ by a command from a controller 407, consecutive pulses from the oscillator 401 are permitted through the switch 402 until time instant $t_j$ is reached, whereupon the comparator 409 provides a coincidence pulse to turn off the switch 403 so that the voltage F in FIG. 17 at $t = t_j$ is held in the capacitor 412, while at the same time starting the ramp voltage generator 410. Time $t_y$ later, the ramp voltage of the ramp voltage generator 410 coincides with the retained terminal voltage across the capacitor 412, whereupon the comparator 413 delivers an output to turn off the switch 402. The number of pulses permitted through the switch 402 during the conduction thereof represents the value of the formula (50), so that $T_j$ is derived through the mode B non-linear counter 404.

While the preceding examples have been concerned with the use of the PR thermocouple conforming to the JIS standards, the standard thermal electromotive force of this thermocouple is proved to well coincide, in practice, with the values of the thermal electromotive force of, for instance, a thermocouple of platinum-13-percent rhodium alloy and platinum specified as standard in NBS Circular 561, and also it will be apparent from the IPTS definitions that essentially the same principles apply to temperature sensors based on other standards.

Another example of the temperature measurement of the invention, this time compensation for higher temperatures using a Chromel-Alumel thermocouple (hereinafter abbreviated as CA), will now be given. The discussion is based on JIS C-1602. In the temperature characteristic of the CA thermocouple the second-order and third-order terms become significant for temperatures above 1,000°C. The thermoelectromotive force E of CA for 1,000<T<1,400 is expressed as:

$$E = 41.31 + 0.039(T - 1,000) - 0.045,6 \times 10^{-4}(T - 1,000)^2 - 0.004,58 \times 10^{-6}(T - 1,000)^3 \ (mV) \qquad (52)$$

Dividing this equation by 0.039 and rearranging, we have:

$$E/0.039 - 59.23 = T - 1.169 \times 10^{-4}(T - 1,000)^2 - 0.117,4 \times 10^{-6}(T - 1,000)^3 \qquad (53)$$

Figure 19:
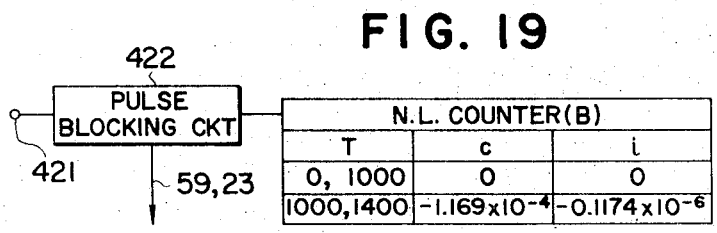
FIG. 19 is a schematic representation of a temperature measuring system for high temperature measurement using a C-A thermocouple embodying the invention.

FIG. 19 shows a circuit for deriving the value of temperature T in this equation. Of a series of pulses corresponding in number to the electromotive force $E$ of the CA, which pulses appear each for every 39 $\mu V$ at a terminal 421, 59.23 pulses are blocked by a pulse blocking circuit 422 and the remainder are permitted thereby, whereby the value of the temperature is obtained on the mode B non-linear counter. As is previously mentioned, 9 the electromotive force of CA may be suitably processed through an amplifier or the like, and also the scale factor may be suitably selected. The CA may also be used to provide a temperature measuring system covering the entire temperature range, as will be described hereinafter.

The thermoelectromotive force of the CA for temperatures below 1,000°C is approximated as:

$$E = 0.041,31 T \ (mV) \qquad (54)$$

with the maximum error of about 6° occurring in the neighborhood of 800°C. For $T>1,000$ equations (52) and (53) hold with high precision. Where errors for temperatures below 1,000°C are not so important, $$E/0.041,31 = T - 0.055,91(T - 1,000) - 1.103,8 \times 10^{-4}(T - 1,000)^2 - 0.110,86 \times 10^{-6}(T - 1,000)^3 \qquad (55)$$

and the other terms other than $T$ on the right side of this equation is only added for ($T>1,000$), then, temperature measurement can be made over the entire temperature range of CA and particularly with high accuracy for temperatures above 1,000°C. To this end, the memories 13 and 15 shown in FIG. 1 are initially imposed with values $2 \times 1,103$, $8 \times 10^{-4}$ and $6 \times 0.110,86 \times 10^{-6}$, respectively, 0.055,91 is previously stored in the register or accumulator 14, the circuits 5 and 11 are provided as additive accumulating circuits, 1,000 is stored upon the memory 37, for the switch 43 an electronic switch is used and initially held in the non-conductive state and adapted to be turned conductive to the side 45 upon application of an output at the terminal 38, which output is adapted to be delivered when the significant figure of the count of the counter 2 reaches 1,000, and a series of pulses each for every 41.31 $\mu V$ is applied to the terminal 1.

In accordance with the invention, it is possible to construct temperature measuring systems using a plurality of temperature sensors such as temperature measuring resistors and thermocouples as described above in appropriate combinations. In case of using a mode B non-linear counter, signals obtained from these sensors are switched in a suitable manner for conversion into respective numbers of pulses, and switching of memory contents of the non-linear counter, possible switching between additive and subtractive operations, and switching of memory contents or control of the delivery of operation commands are effected for each sensor. In addition, the register or accumulator contents corresponding to each sensor are cleared every time the measuring operation ends. The value of temperature in this way may be directly displayed, transmitted for display at remote sites, recorded or taken out in a suitable form to control other systems or to be used in computing operations involved in such control.

In addition to the aforedescribed examples, the characteristics of temperature measuring resistors and thermocouples may also be simulated and used to derive the temperature with systems using a nonlinear counter of the type where the numbers corresponding to the coefficients in the polynomials in equations (13), (14), etc. are changed according to temperature. For example, coefficients of terms of first power, second power, third power, etc. in the polynomial function representing the thermoelectromotive force of a thermocouple may be obtained from an electromotive force-temperature characteristic table therof, and by selecting the scale factor such that the coefficient of the first power term is adjusted to unity. The values of $c, i$, etc. may be determined by characteristic table from the corresponding differential coefficients for second-order, third-order, etc. The non-linear counter then represents the thermocouple characteristic. Where the differential coefficient of second-order varies as a function of temperature but the differential coefficient of third-order is constant, the characteristics are represented by a third power polynomial like equation (14). Alternatively, this is also represented by a second power polynomial with variable coefficient by so arranging to have the contents of the memory 13 in FIG. 1 vary according to temperature. In general, by varying the contents of memories according to temperature, it is possible to obtain non-linear counters precisely simulating the temperature characteristic of a temperature measuring register or thermocouple. With certain sensors, even the differential coefficient of the first order changes according to temperature. In case, the differential coefficient of first-order varies slightly, the corresponding value of such change of differential coefficient may be entered in the register or accumulator 14 in FIG. 1 without changing the scale factor.

Figure 20:
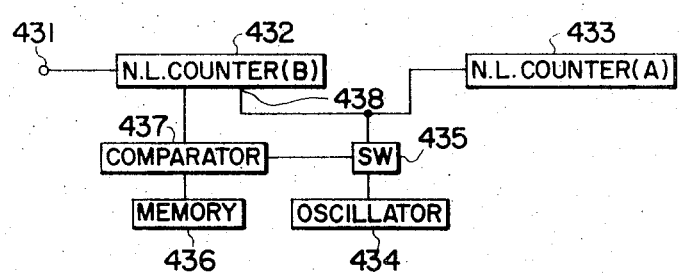
FIG. 20 is a block diagram showing a circuit for deriving values as a function of temperature embodying the invention.

In accordance with a further aspect of the invention, it is possible to provide systems for deriving not only the value of temperature but also the value of polynomial functions of temperature. FIG. 20 shows an example of such circuit for deriving the value of a function of temperature. In this circuit, a pulse series obtained from a temperature sensor is applied to a terminal 431, and mode B non-linear counter 432 derives the corresponding value of temperature. Then, output pulses of an oscillator 434 are transmitted through an electronic switch 435 to both a reverse count terminal 438 of mode B non-linear counter 432 and to mode A non-linear counter 433. When the number of pulses permitted through the electronic switch 435 becomes equal to the previous count of the mode B non-linear counter 432 representing temperature, the significant figure of the current contents of the mode B non-linear counter 432 becomes 0 and coincides with a preset content 0 in a memory 436, whereupon a comparator 437 provides an output to turn off the electronic switch 435. Until the switch 435 is turned off, a train of pulses being equal in number to the previous count of the mode B non-linear counter 432 representing temperature are applied to the mode A non-linear counter 435. Thus the mode A non-linear counter 435 derives the corresponding value of the function $X$ in any one of equations (2), (3), (4), (5), (6), (7), (8), (9), etc., with $P$ substituted for temperature. The above circuit is useful in such cases where a temperature compensation coefficient in whatever measurement is approximated by a polynomial function of temperature or temperature difference between variable working temperature value and specified normal temperature. For example, it may be used in flow meters where the temperature compensation coefficient is often expanded as high order polynomials of the difference between nominal design temperature and working temperature.

In the aforedescribed example in FIG. 20, the value of a function of temperature is derived by applying the pulses representing temperature obtained by reading out the content of the mode B non-linear counter 432 to the mode A non-linear counter 433, but is may also be derived by applying the output pulse of the gate 28 of the mode B non-linear counter in FIG. 1 directly to the mode A non-linear counter 433 in FIG. 20.

The circuit for deriving the value of a function of temperature may also be obtained by using the mode A non-linear counter 433 shown in FIG. 20 for the counter 56 in the circuit of FIG. 5. In this case, the mode A non-linear counter 53 is constructed to represent the output signal corresponding to the temperature of a sensor, and output signal of the sensor is given as $X_1$ to the memory 54, whereby a number of pulses representing the value of temperature is obtained at the terminal 1, and from which the corresponding value of a polynomial function of temperature may be derived by the mode A non-linear counter 56.

The temperature $T$ in equations 21 and 22 is based on the Celsius scale. If $T$ is a difference of temperature from a reference temperature, these equations will also be expressed by a quadratic equation of the same type. Thus, the above method of deriving the value of a function of temperature may be utilized in case of deriving the value of a function of temperature difference. The same applies where the sensor characteristic is expressed as higher order polynomials of the temperature than the quadratic one.

As an example of the aforedescribed derivation of the value of polynomial functions of temperature, a reference temperature of a thermocouple may be compensated for, as will be described hereinafter.

It is well known that there is a relation:

$$E(T_3, T_1) = E(T_3, T_2) + E(T_2, T_1)$$

(56)

where $E(T_3, T_1)$, $E(T_3, T_2)$ and $E(T_2, T_1)$ are respective values of the thermoelectromotive force of a thermocouple when the temperatures of its junctions are $T_3$ and $T_1$, $T_3$ and $T_2$, and $T_2$ and $T_1$, respectively. Assuming $T_1 = 0°C$, $T_3$ to be the working temperature to be measured, and $T_2$ to be the reference temperature (cold junction temperature in high temperature measurement), $E(T_3, T_2)$ constitutes the value of the output signal obtained from the thermocouple, so far as $T_2$ is not excessively high, an equation $$E(T_2, 0) = BT_2 + CT_2^2 = BT_2 + (C/B^2)(BT_2)^2$$

(57)

usually holds with sufficient precision.

In such case, by placing a temperature measuring register in equilibrium with the temperature $T_2$, from equations (26), (27), (28) and (29), we obtain:

$$P_r - S_r = T_2 + c_r T_2^2$$

(58)

Hence, $$BP_r - BS_r = BT_2 + (c_r/B)(BT_2)^2$$

(59)

Figure 21:
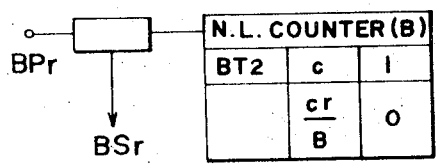
Figure 22:
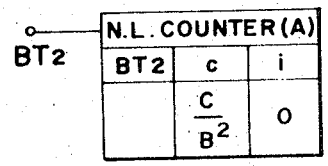

A circuit for deriving the value of $BT_2$ in this equation may be constructed by replacing the mode B non-linear counter 432 in FIG. 20 and its input circuit with a circuit shown in FIG. 21. To derive the value of $E(T_2, 0)$ in equation (57), the reading of $BT_2$ from the above circuit in FIG. 20 is coupled to the mode A non-linear counter 433 by constructing mode A non-linear counter 433 as shown in FIG. 22. The reading in the number of pulses of $E(T_2, 0)$ thus obtained from the above circuit may be used to obtain the reading of the working temperature $T_j$ at measuring points with a precisely corrected reference temperature by using FIG. 23 and FIG. 16.

Figure 23:
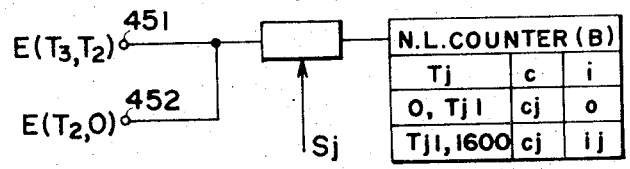

FIG. 23 shows the concrete implementation of the derivation of the value of the working temperature $T_j$ based on the corrected reference temperature. Referring to FIG. 23, a train of pulses corresponding in number to the signal $E(T_3, T_2)$ from the thermocouple is fed to a terminal 451, and the reading in the number of pulses from the mode A non-linear counter of FIG. 22 is fed to a terminal 452 of the circuit of FIG. 23. In this case, to use the scale factor conforming to the FIG. 16 mode B non-linear counter for equation (41), the signal $E(T_3, T_2)$ is converted to a train of pulses, each pulse corresponding to 8.387,8 $\mu V$. Also, the number of pulses applied to the terminal 431 in FIG. 20, and the mode B non-linear counter 432 and the mode A non-linear counter 433 (and hence FIG. 21 mode B non-linear counter and FIG. 22 mode A non-linear counter) are arranged to conform to this scale factor. For example, equation (57) for PR reduces, for $T_2 \pm 100$, to:

$$E(T_2, 0) = 5.35T_2 + 0.011T_2^2 = 5.35T_2 + 0.000,384,3 \times (5.35T_2)^2$$

(60)

Also, equation (59) reduces to:

$$5.35P_r - 5.35S_r = 5.35T_2 - 0.000,147,85/5.35 \times (5.35T_2)^2 = 5.35T_2 - 0.000,027,64 \times (5.35T_2)^2$$

(61)

Thus, $c_r/B$ in FIG. 21 counter is set to $-0.000,027,64$, $C/B^2$ in FIG. 22 counter is set to $0.000,384,3$, and $B = 5.35$ for both counters. The scale factor is set such as mentioned above.

In the compensation of a reference temperature of a thermocouple, the same effect as deriving the value of a funxtion of temperature may also be obtained by using the mode A non-linear counter 433 shown in FIG. 20 for the counter 56 in the circuit of FIG. 5.

The above reference temperature compensation method may also be accomplished by using a thermistor, such as one disclosed in "Digital Thermistor Thermometer" by Naonobu Shimomura, Treatise No. 264, presented in the National Convention of the Institute of Electronics and Communication Engineers of Japan held in 1971. With this thermometer, a train of pulses proportional in number to the absolute temperature of the thermistor can be obtained. By setting the proportionality constant to B, the value of $BT_2$ is derived from the difference between the above pulse number for the absolute temperature and 273.15. The reading of $BT_2$ is then coupled to the FIG. 22 circuit for obtaining the value of $T_j$ based on the corrected reference temperature.

Another example of compensation of a reference temperature of a thermocouple will now be shown. A signal $V$ from a temperature measuring resistor held at a reference temperature $T_2$ of a thermocouple is generally given as:

$$V = A_r + B_r T_2 + C_r T_2^2$$

(62)

The temperature $T_2$ can be converted into a corresponding time $t_1$ by a method disclosed in the specification of U.S. application Ser. No. 105,232) Series of 1970) entitled, "Temperature Measuring Apparatus," filed Jan. 11, 1971, now Pat. No. 3,766,782, granted Oct. 23, 1973.

Figure 24:
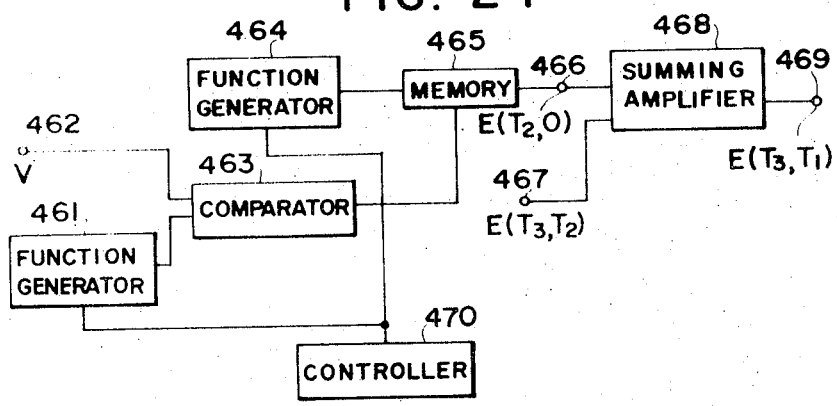

A function generator 461 shown in FIG. 24 is used to this end. More particularly, the function generator 461, which is designed to simulate the temperature measuring resistor characteristic, is started at $t = 0$, and its output is fed to a comparator 463 which also receives the signal $V$ from the temperature measuring resistor and appearing at a terminal 462. The comparator 463 generates a coincidence pulse after the lapse of time $t_1$ proportional to temperature $T_2$. Also use is made of another function generator 464 which generates an output signal representing a function of:

$$Bt + Ct^2 \tag{63}$$

which corresponds to the right side of equation (57) with $T_2$ replaced with $t$ proportional to $T_2$ and has same proportionality constant with function generator 461. Both the function generators 461 and 464 are started simultaneously by a controller 470. Upon generation of the coincidence pulse from the comparator 463 at $t = t_1$, the output of the function generator 464 is sampled and held in a memory circuit 465. As a result, the value of $E(T_2, 0)$ in equation (57) is made available at a terminal 466. This value is added together with a signal $E(T_3, T_2)$ which is derived from the thermocouple and applied to a summing amplifier 468, whereby an output signal representing $E(T_3, 0)$ in equation (56) is obtained at output terminal 469. This output signal is converted into a corresponding pulse series, which is then applied to a mode B non-linear counter such as the one in FIG. 16 to derive the value of temperature $T_j$ ($T_3$ in this case) based on the corrected reference temperature. The signals $E(T_2, 0)$ and $E(T_3, T_2)$ may not necessarily feed to the summing amplifier 468 for summation, but they may also be converted into respective pulse series, which are then fed to the mode B non-linear counter.

While the equations (62) and (57) and the corresponding time function dealt with in the above example are all of the second degree, the same principles also apply to functions of other degrees. In particular, depending upon the required accuracy, the range of $T_2$, and the type of the temperature measuring resistor and thermocouple employed, linear functions may sometimes suffice, and in such cases, the construction of the function generator may be simplified.

Also, while in the above example the analog value and the corresponding pulse number for $E(T_2, 0)$ are derived for each measurement of $T_3$, where a plurality of thermocouples is held in equilibrium with the common reference temperature subject to no rapid fluctuations, the pulse number once obtained for $E(T_2, 0)$ may be remembered by a register for repeated use when the thermocouples are switched one over to another for repeated measurements.

The IPTS was revised in 1968, and for a temperature range between 630.74°C and 1,064,43°C it is related to the old IPTS-48 by merely changing the values of the coefficients in equation 22, which shows that the measurements are made by slightly changing the numerics of non-linear counters.

For a temperature range between 0°C and 630.74°C, the temperature $T_{68}$ on the new scale is given by, $$T_{68} = T + 0.045(T/100)(T/100 - 1)(T/419.58 - 1)(T/630.74 - 1)°C \tag{64}$$

(While in the IPTS capital $T$ is used for the Kelvin Scale, but $T$ in equation (64) is based on the Celsius Scale.)

The variable $T$ in equation (64) is defined by an equation of the same form as equation (21), and equation (64) reduces to:

$$T_{68} = (1 - 0.000,45)T + 6.285,946 \times 10^{-6}T^2 - 1.955,986 \times 10^{-8}T^3 + 1.700,385,3 \times 10^{-11}T^4 \tag{65}$$

Thus, it will be seen that the value of $T_{68}$ may be derived by first deriving the value of $T$ using a mode B non-linear counter for equation (21) and feeding the reading of $T$ to a mode A non-linear counter for equation (65).

Figure 25:
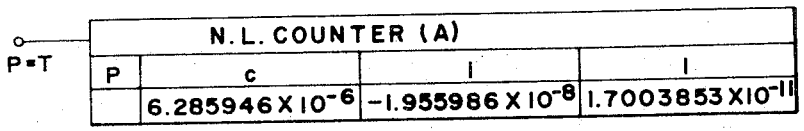
FIG. 25 is a block diagram of a network using a non-linear counter for temperature measurement based on IPTS-'68 embodying the invention.

FIG. 25 shows a mode A non-linear counter for deriving the value of $T_{68}$ from a corresponding value of $T$. In this case, since the coefficient of the first term of $T$ on the right side of equation (65) is not unity, a number 0.000,45, the difference of the coefficient, is previously given to the final register (register 17 in FIG. 1) accumulating $i$. Again in this case, the circuit for deriving the value of $T_{68}$ may also be obtained by using the mode A non-linear counter shown in FIG. 25 for the counter 56 in the circuit of FIG. 5.

Figure 26:
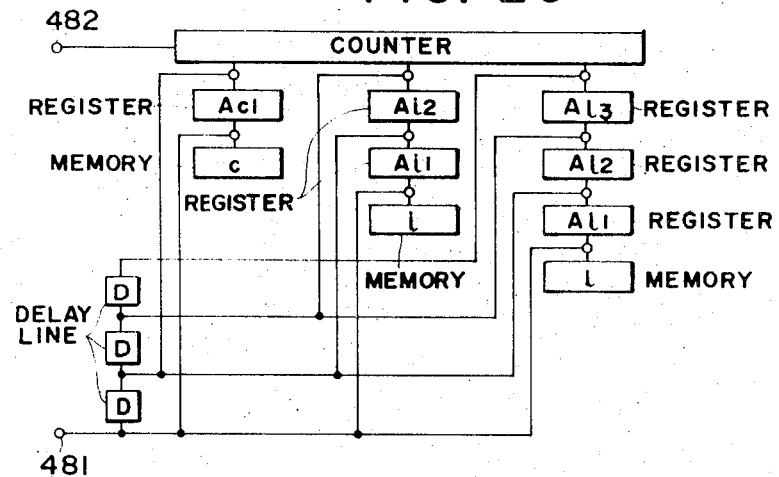
FIG. 26 is a schematic block diagram of a cascade accumulator.
Figure 27:
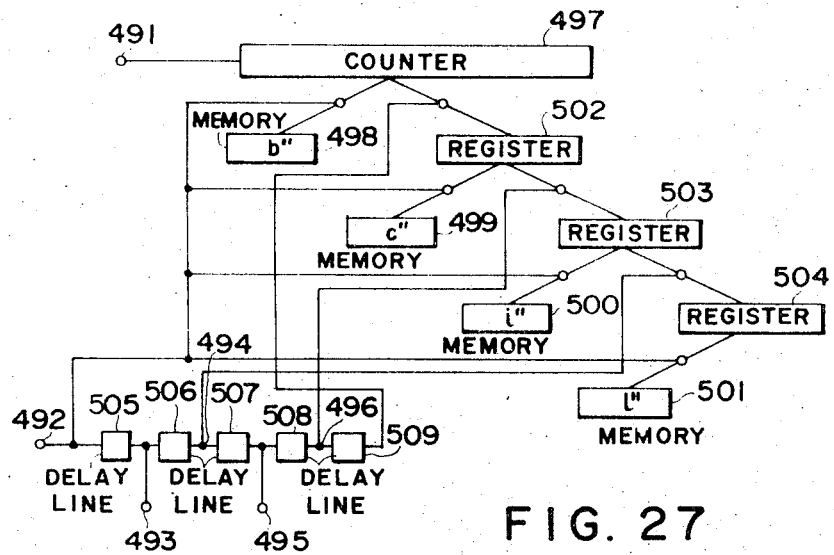
FIG. 27 is a block diagram of a network using a common accumulator for FIG. 26.

The non-linear counter, either mode A or mode B, described so far, has been of a construction as shown in FIG. 26, which has a plurality of independent cascade accumulating circuits for the cascade accumulation of contents representing $c$, $i$, $l$, etc. of respective memories. Such construction may be replaced with a construction as shown in FIG. 27. In this construction, a terminal 492 is connected to the output terminal of the gate 28 or contact terminal 44 of the switch 43 in FIG. 1. Upon appearance of a command pulse at the terminal 492, the memory contents represented by $b$, $c$, $i$ and $l$ are algebraically added to the respective contents of the counter 497 and register or accumulators 502, 503 and 504. Then, upon appearance of delayed pulses from delay lines 505 to 509, the contents of the accumulators are algebraically added in cascade to the next stages 403, 502 and 499. The memory 498 is given a correcting value when the coefficient of the first-order term of $T$ in equation (55) or (65) is slightly different from unity. Memories of FIG. 27 are given coefficients $\pm b$, $\pm 2c$, $\pm 6i$ and $\pm 24l$, represented by $b''$, $c''$, $i''$, and $l''$, respectively, corresponding to each mode of a counter such as mode A or B non-linear counter. We have described the mode A and B non-linear counters included in embodiments of this invention. This invention can also be carried out by using the following cascade accumulators in several forms, which can be regarded as generalized form of non-linear counters.

Figure 29:
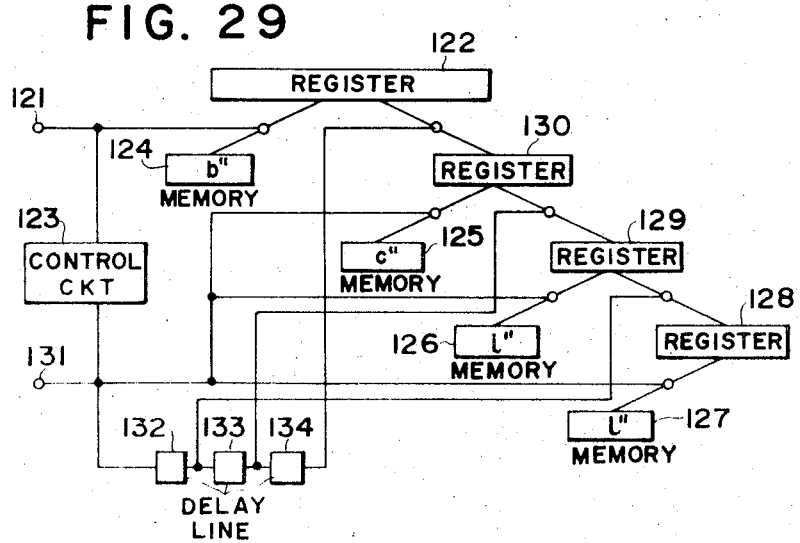
FIG. 29 is a block diagram showing another type of cascade accumulator employed in accordance with the invention.

Detailed operation of the network of FIG. 27 will now be described in connection with a circuit of FIG. 29. Referring to FIG. 29, numeral 121 designates an input terminal to which input pulse series are applied, numerals 122, 128, 129 and 130 designate registers or accumulators, numerals 124, 125, 126 and 127 refer to memories, and numerals 132, 133 and 134 indicate delay lines. Upon appearance of a pulse at the input terminal 121, the contents of the memory 124 are accumulatively entered in the register or accumulator 122. Upon appearance of a pulse at a terminal 131, the contents of the memories 125, 126 and 127 are accumulatively added in the respective register or accumulators 130, 129 and 128. Further, the contents of the registers or accumulator 128 is accumulatively entered in cascade in the next stage register or accumulator 129, whose contents are in turn accumulatively entered in cascade in the third stage register or accumulator 130, whose contents are in turn accumulatively entered in cascade in the register or accumulator 122. In this manner, successive accumulative operations are effected in cascade. In other words, the contents of the memory 125 are accumulated in cascade through register or accumulator 130 into register or accumulator 122. Similarly, the contents of the memory 126 are accumulated in cascade through register or accumulator 129, and 130 into register or accumulator 122. Also, the contents of the memory 127 are accumulated in cascade through register or accumulator 128, and 129 and 130 into register or accumulator 122.

If a circuit 123 to be described later is omitted or shortcircuited, with terminal 121 directly connected to terminal 131, the resultant network is quite similar to that of FIG. 27. In this case, with $b'$, $2c'$, $6i'$ and $24l'$, represented by $b''$, $c''$, $i''$, and $l''$, respectively, given to the respective memories 124, 125, 126 and 127, for P input pulses, register or accumulator 122 acquires the input $$b'P \tag{66}$$

from the memory 124, $$c'P^2 + c'P \tag{67}$$

from the memory 125 by cascade accumulation through the register or accumulator 130, $$i'P^3 + 3i'P^2 + 2i'P \tag{68}$$

from the memory 126 by cascade accumulation through the registers or accumulators 129 and 130, and $$l'P^4 + 6l'P^3 + 11l'P^2 + 6l'P \tag{69}$$

from the memory 127 by cascade accumulation through the registers or accumulators 128, 129 and 130 and the total reading $X$ from the register or accumulator 122 is thus $$X = (b' + c' + 2i' + 6l')P + (c' + 3i' + 11l')P^2 + (i' + 6l')P^3 + l'P^4 \tag{70}$$

Thus, by setting $$b' = b - c + i - l \tag{71}$$

$$c' = c - 3i + 7l \tag{72}$$

$$i' = i - 6l \tag{73}$$

and $$l' = l \tag{74}$$

equation (70) becomes exactly $$X = bP + cP^2 + iP^3 + lP^4 \tag{75}$$

By previously giving a to the accumulator 122 we obtain $$X = a + bP + cP^2 + iP^3 + lP^4 \tag{76}$$

In the light of equations (2), (3), (4) and (5), it will be seen that the aforedescribed cascade accumulator for equation (75) or (76) is a generalized form of the mode A non-linear counter and achieves the same end thereof. Also, similar to the mode A non-linear counter, the values $b$, $c$, $i$, $l$, etc. may be changed in the course of operation, or, alternatively, the accumulative operation itself may be controlled such that, for example, $X$ is given as a second-order polynomial of $P$ for a certain range of $X$ or $P$, a third-order polynomial of $P$ for another range and so forth.

The circuit 123 in FIG. 29 may correspond to the circuit 39 in FIG. 1, or it may be an operation control circuit as previously described in connection with FIG. 28. It is thus adapted to deliver operation command pulses in with change in the content $X$ of register or accumulator 122 to terminal 131. With this circuit incorporated and with $1/b$, $-2c/b$, $b-6i/b$ and $-24l/b$, given to the respective memories 124, 125, 126 and 127, for P input pulses the network may derive the corresponding value of $X$ related to $P$ as $$P = bX + cX^2 + iX^3 + lX^4 \tag{77}$$

If $P - a$ is applied to the terminal 121 by incorporating a circuit like one shown in FIG. 9, $$P = a + bX + cX^2 + iX^3 + lX^4 \tag{78}$$

It will be seen that this time the cascade accumulator for equations (77) and (78) achieves the same end of the mode B non-linear counter. Thus, it is clear that a register or an accumulator, not necessarily a counter, into which stored content or contents of memory or memories are accumulated in cascade in such a way that the cascade accumulation is made corresponding to pulse or to the increment of the content of the register or accumulator at each pulse, can be used in place of a non-linear counter for the purpose of this invention.

The cascade accumulator described above may be used to construct a system for deriving the value of temperature or a function of temperature.

Figure 30:
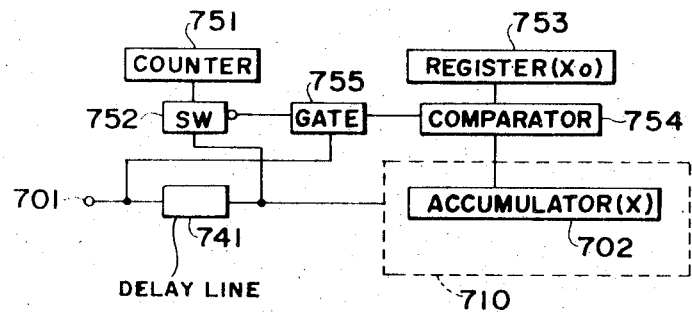
FIGS. 30 and 31 are block diagrams of circuits for deriving the roots of high order polynomials used in accordance with the invention.

FIG. 30 shows a system for deriving a value $P_0$ of $P$ corresponding to a given value $X_0$ of $X$ embodying the invention. Referring to FIG. 30, the dashed rectangle 710 represents the same circuit as that of FIG. 29 except that the circuit 123 therein is short-circuited, that is a circuit for equation (76). Numeral 701 corresponds to the terminal 121 in FIG. 29. An accumulator 702 in the circuit 710 corresponds to the accumulator 122 in FIG. 29 and there is provided a delay line 741 coupled to the terminal 701. The content value $X$ of the accumulator 702 is compared ($X$ being assumed to increase with $P$) with $X_0$ given to a register 753 by a comparator 754 and when a condition $X \; X_0$ sets in, the comparator 754 provides output to a gate 755 controlling the pulse input, thus turning off an electronic switch 752. A counter 751 is provided to count the number of input pulses until the switch 752 is turned off. In this manner, a count $P_0$ satisfying an equation $$X_0 = a + bP_0 + cP_0^2 + iP_0^3 + lP_0^4 \qquad (79)$$

is obtained. It may be derived in the same manner even where the coefficients in equation (76) change in course of operation.

Figure 31:
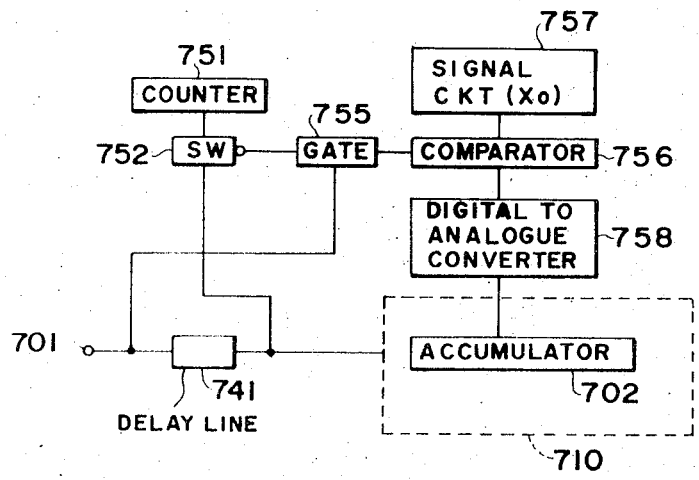

FIG. 31 shows a modification of the system of FIG. 30. In this system, a digital-to-analog converter 758, an analog comparator 756 and a signal circuit 757 are used. The other parts are the same as the corresponding parts in the FIG. 30 system, so they are designated by like reference numerals. In this case, $X_0$ is given as an analog signal to the signal circuit 757. The counter 751 indicates the value of $P$ when $X = X_0$ as in the FIG. 30 system. The FIG. 30 and FIG. 31 systems are suited to accurately determining temperature based on the 1968 revision of the IPTS between 0°C and 630.74°C.

As mentioned earlier, the temperature $T_{68}$(°C) is given by equation (65) or in the form $$T_{68} = bT + cT^2 + iT^3 + lT^4 \qquad (80)$$

where the variable $T$ is defined by an equation of the same form as equation (21). The value of $T$ may be derived by using the system of FIG. 30 or FIG. 31 and giving the signal from the sensor as $X_0$. The number of pulses thus derived for T may then be applied to the FIG. 29 circuit with circuit 123 short-circuited, whereby the corresponding value of $T_{68}$ in equation (65) may be accurately obtained. In practice, the value of $T_{68}$ may be accurately and directly obtained by feeding a signal from a platinum temperature measuring register to the register 753 in the FIG. 30 system or signal circuit 757 in the FIG. 31 system and replacing the counter 751 with the FIG. 29 circuit with circuit 123 short-circuited.

The same principles as above also apply to derive the value of polynomial functions of temperature or temperature difference.

While the cascade accumulative operation in the above systems has been adapted to be caused by external pulses applied to the terminal 701, this is by no means limitative in accordance with the invention, for example, where the additive or subtractive accumulative operation is done by a serial adder, a timing pulse generator and a cascade accumulative operation control circuit may be provided within the accumulating unit 710 so as to generate the aforementioned $P$ pulses corresponding in number to the number of cascade accumulative operations. In such case, in place of applying external pulses to the terminal 701 of FIG. 30 or FIG. 31, the accumulative operation may be stopped when a condition $X = X_0$ sets in, and the number of the previous operations caused consequentively may be counted by the counter or by the system of FIG. 29. Also, where the equation (76) is reduced to a first-order polynomial of $P$ for a certain range of $P$ or $X$, the aforementioned $P$ pulses should, of course, correspond in number to the number of cascade accumulative operations plus the number of accumulative operations for the first power term of $P$.

The following description is concerned with a method with which to economically realize a network capable of efficiently effecting the above cascade accumulation. Such a method may be applied, of course, to the circuit of FIG. 29, which is a generalized form of the non-linear counter. It may also be employed to realize a circuit having the same function as a mode A or mode B non-linear counter by having $b = 1$ in equations (76) and (78).

The cascade accumulation described above is generally implemented with a system as shown in FIG. 32. In FIG. 32, numerals 805 to 808 designate registers, and numerals 801 to 804 designate memories. Corresponding to a pulse, the contents of the memories 801 to 804 are non-destructively read out and algebraically added to the contents of the respective registers 805 to 808. Also, the contents of the registers 808, 807 and 806 are algebraically added to those of the respective next stage registers 807, 806 and 805. As has been described earlier, by previously giving the memories 801 to 804 respective numbers determined by $b$, $c$, $i$ and $l$, and also the register 805 the number "a," for P pulses, the corresponding value of $X$ in equation 76 is obtained at the register 805. To obtain the value of $X$ satisfying equation (78), the contents of the memory 801 is added to the register 805 for each of $(P - a)$ pulses, and the addition of the contents from memory 802 to register 806, from memory 803 to register 807, from memory 804 to register 808, from register 808 to register 807, from register 807 to register 806 and from register 806 to register 805 is repeated a number of times proportional to the change in the contents of the memory 805 for each of the aforesaid pulses.

In the former case, the same results may be obtained with an arrangement where the contents of the memories 801 to 803 are previously given to the respective registers 806 to 808, as shown in FIG. 33, where registers 812 to 814 previously given with memory contents are identified by the numerals 812, 813 and 814. In the latter case, the same results may be obtained by previously giving the registers 807 and 808 respective memory contents of the memories 802 and 803. With the above systems of FIGS. 32 and 33, however, the pertinent cascade accumulative operation should be repeated, a great number of times, requiring a considerable time to obtain the value of $X$ in equation (76) or (78). In accordance with the invention, the time required until the value $X$ is derived is greatly reduced even by serially executing the cascade accumulative operation.

FIG. 34 shows a cascade accumulator according to the invention, and which corresponds to the circuit of FIG. 32. Referring to FIG. 34, the contents of memories 801 to 804 and registers 805 to 808 are simultaneously read out and transferred to associated ones of full adders 821 to 827. The contents of the "first" memory 804 are read out nondestructively, or, alternatively, they may be fed back each time they are read out. The contents thus read out are algebraically added together with the simultaneously read-out contents of the "second" register 808 through the first full adder 827, whose resultant output is re-written in the register 808 and is also algebraically added together with the simultaneously readout contents of the "third" memory 803 through the second full adder 826, whose resultant output is in turn algebraically added together with the simultaneously read-out contents of the "fourth" register 807 through the third full adder 825, whose resultant output in turn is re-written in the register 807 and is also fed together with the simultaneously read-out contents of the "fifth" memory 802 to the full adder 824, and so on.

If negative numbers are to be given to the memories 801 to 804, the 2's complement of the absolute value of them and 1 as the sign bit may be given. By so doing, when each result is negative, the adder output consists of the 2's complement of its absolute value and 1 as the sign bit, so that it may be directly given as an operand input to the next stage adder. In practice, since it is possible to have always a positive value as the final contents of the register 805, the final result obtained in the register 805 may directly represent $X$ in equation (76), or it may indicate the value of $X$ in equation (78) by separately controlling only the addition of contents of memory 801 to register 805 as will be described later.

The timing of the read-out of the memories and registers should be corrected for respective delay times involved in the connection line and associated adders. These timings are, however, theoretically the same, so that they are regarded to be read out simultaneously in this description. The same principles apply where certain memories are omitted from the circuit of FIG. 34.

FIG. 35 shows another cascade accumulator according to the invention, and which is the counterpart of the circuit of FIG. 33. In this system, its registers 812 to 814 are previously given respective contents of the corresponding memories 801 to 803 in FIG. 34.

To take care of equation (78), the memory 801 and adder 822 in FIG. 34 are disconnected, with the output of the adder 823 coupled to the adder 821, and the contents of the memory 801 are added to the register 805 for each of $(P-a)$ pulses, while the cascade accumulating operation is repeated a number of times proportional to the change in the contents of the register 805 for each of the $(P-a)$ pulses. As described above, it is possible by the invention to reduce the time required to perform one cycle of cascade accumulation to nearly one word time, which otherwise takes much more time in case of serial addition.

While the FIG. 34 and FIG. 35 systems deal with the fourth order polynomial equations (76) and (78), systems dealing with other polynomial equations of other than fourth-order may also be realized using the same principles. It is also possible that these systems adapt for the equations (76) and (78) where the coefficients of right sides change during operation. In the simplest case of a second-order polynomial, the output of the adder 827 in FIG. 34 is directly given to the adder 822, and adders 823 to 826, registers 806 and 807 and memories 802 and 803 are no longer necessary. Further, depending upon the coefficients in equations (76) and (78), the memory 801 and adder 822 may also be omitted.

Usually, the memory contents are greater the higher the pertinent adder stage. The contents of the register, also, are greater the higher the associated adder stage as well as the number of cascade accumulating operations. Accordingly, the lower stage memories and registers may be constructed with smaller numbers of bits.

Also, the higher stage memories and registers may be constructed with only higher bit positions in conformity to the required precision to save the number of component elements of the memory of register. Of course, in this case, the same position bits in the individual memories and registers are read out substantially simultaneously. For an adder receiving the operand output of a memory or register of its own stage and the operand output of the previous lower stage adder, the unnecessary lower bits may be removed from the output number of the previous adder. In addition, for the alignment of the sign bit position, vacant positions of operant from previous lower stage up to the same position of the sign bit for the output number from the memory or register of a stage may each be filled with 0 if the sign bit of the previous lower stage adder output is 0, while they be filled with 1 if the sign bit of the previous lower stage adder output is 1.

Numerous changes may be made in the above-described apparatus and the different embodiments of the invention may be made without departing from the spirit thereof; therefore, it is intended that all matter contained in the foregoing description and in the accompanying drawings shall be interpreted as illustrative and not in a limiting sense.

I claim:

1. Apparatus for measuring temperature with a high degree of accuracy, comprising:
   a. non-linear temperature sensing means having a given set of characteristics, for providing an output signal indicative of the sensed temperature, and
   b. cascade accumulation means including memory means for storing the number indications determined by the given set of characteristics of said temperature sensing means, and responsive to the output signal of said temperature sensing means for repetitive cascade accumulation of said stored number indications to provide an accurate indication of the measured temperature, said cascade accumulation means comprising at least one memory means and at least one register means and a device capable of receiving and storing digital information and said cascade accumulation means operative to effect one cascade accumulation in a manner such that the content of said memory means is added to the content of said register means and the content of said register means is added to the content of said device.

2. Apparatus as claimed in claim 1, wherein there is further included means for varying the number indications stored at said memory means during repetitive cascade accumulations.

3. Apparatus as claimed in claim 1, wherein there is further included means for controlling the execution of said cascade accumulation during repetitive cascade accumulations.

4. Apparatus as claimed in claim 1, further including means for generating pulses, wherein said one cascade accumulation is executed corresponding to each pulse, and there is further included means for detecting the coincidence of the content of said device with the signal derived from said temperature sensing means, and a count means for counting each of the pulses until the above-mentioned coincidence is detected.

5. Apparatus as claimed in claim 1, further including means for generating pulses, wherein said one cascade accumulation is executed corresponding to each pulse and there is further included means for detecting the coincidence of the content of said device with the signal derived from said temperature sensing means and applying the above-mentioned pulse to a second cascade accumulation means until said coincidence is detected, said second cascade accumulation means comprising at least one memory means and at least one register means and a device capable of receiving and storing digital information and said second cascade accumulation means operative to effect one cascade accumulation in a manner such that the content of said memory means of said second cascade accumulation means is added to the content of said register means of said second cascade accumulation means and the content of said register means of said second cascade accumulation means is added to the content of said device of said second cascade accumulation means and above-mentioned one cascade accumulation of said second cascade accumulation means is executed corresponding to each of said applied pulses.

6. Apparatus as claimed in claim 1, wherein said device is a counter.

7. Apparatus as claimed in claim 1, wherein said temperature sensing means provides its output signal in the form of a plurality of pulses and applies these pulses to said cascade accumulation means, and said cascade accumulation is executed a number of times coresponding to the change of the content of said device at every pulse applied.

8. Apparatus as claimed in claim 7, wherein there is further included means for applying pulses corresponding in number to the content of said device to a second cascade accumulation means comprising at least one memory means and at least one register means and a device capable of receiving and storing digital information and said second cascade accumulation means operative to effect one cascade accumulation in a manner such that the content of said memory means of said second cascade accumulation means is added to the content of said register means of said second cascade accumulation means and the content of said register means of said second cascade accumulation means is added to the content of said device of said second cascade accumulation means and said one cascade accumulation of said second cascade accumulation means is executed corresponding to each of said pulses applied to said second cascade accumulation means.

9. Apparatus as claimed in claim 7, wherein said device is a counter.

10. Apparatus as claimed in claim 7, wherein said temperature sensing means comprises a platinum and platinum rhodium alloy thermocouple, and there is further included means for generating a number of output pulses corresponding exponentially to the output of said thermocouple, thereby to compensate the characteristics of the low temperature region of said thermocouple.

11. Apparatus as claimed in claim 1, wherein said register and said device are memories and said cascade accumulation means comprises at least first, second and third memories and at least first and second adders and means for reading out substantially simultaneously the contents of all of said memories and applying the contents of said first and second memories to said first adder, and applying the content of said third memory and the output of said first adder to said second adder.

12. Apparatus as claimed in claim 1, wherein said temperature sensing means comprises a thermocouple and there is further included means for maintaining a second temperature sensing means in equilibrium with the temperature of reference junction of said thermocouple, thereby to compensate for the variation of the reference temperature of said thermocouple.

13. Apparatus for measuring temperature with a high degree of accuracy, comprising:
  a. non-linear temperature sensing means having a given set of characteristics for providing a number of pulses representing the output signal of the temperature sensor; and
  b. cascade accumulation means including memory means for storing the number indications determined by the given set of characteristics and having $N$ stages, said cascade accumulation means repetitively cascade accumulating the memorized contents of said memory means to provide an output from the Nth stage indicative of t of the following equation:

$$E = a + bt + ct^2 + \cdots + xt^N$$

where $a, b, c, -x$ are constants determined by the set of characteristics of said temperature sensing means and $E=$ the number of pulses representing the output signal of the temperature sensor, and $t$ represents the temperature sensed.

* * * * *

UNITED STATES PATENT OFFICE
CERTIFICATE OF CORRECTION

Patent No. 3,843,872  Dated October 22, 1974

Inventor(s) Naonobu Shimomura

It is certified that error appears in the above-identified patent and that said Letters Patent are hereby corrected as shown below:

Col. 5, line 5, Equation (1) should read

-- $X = P + 2c(1 + 2 + \text{---} + P) = P + cP(P + 1)$ --.

line 60, Equation (8) should read -- $X = P$ for $P < P_1$ --.

Col. 6, line 8, after "X" delete "is" and substitute -- in --.

Col. 7, line 41, correct "countd" to -- counted --;

line 61, after "dashed" delete "+" and substitute -- rectangle --;

after "In" insert -- addition, --.

Col. 8, line 6, change "onebit" to -- one-bit --;

line 44, Equation (11) should read:

-- $X_{P+n} - X_P = n - 2cX_P(X_{P+n} - X_P)$ --;

Col. 10, line 26, change "$2C_1$" to -- $2c_1$ --;

line 27, change "$2C_1$" to -- $2c_1$ --;

change "$2C_2$" to -- $2c_2$ --.

Col. 13, line 25, Equation 26, delete the parenthesis, i.e.

"$\ldots T(r^2$" should read -- $\ldots Tr^2$ --;

line 56, change "In" to -- If --.

UNITED STATES PATENT OFFICE
CERTIFICATE OF CORRECTION

Patent No. 3,843,872       Dated October 22, 1974

Inventor(s) Naonobu Shimomura

It is certified that error appears in the above-identified patent and that said Letters Patent are hereby corrected as shown below:

Column 14, line 14, Equation (31) should read:

$$R = R_0[1 + AT + BT^2 = C(T-T_{100})T^3]$$

line 34, after "Substituting" delete "$T^-$" and substitute -- $T_-$ --.

Column 15, line 32, Equation (39) should read: -- $c_j = 0.000,288,78$ --;

Column 16, line 16, Equation (46) should read: -- $T_{j1} = 978$ --;

Column 16, line 41, Equation (47) should read:

$$P_j + S_j(1 - e^{-P_j/74.07}) = T_j + c_j T^2$$

line 51, Equation (48) should read:

$$P_j + S_j(1 - e^{-P_j/74.07}) = T_j + c_j T_j^2 + i_j(T_j - T_{j1})^3$$

line 59, change "$T_j < T_j$ to -- $T_j < T_{j1}$ --;

line 63, the term should read: -- $e^{-P_j/74.07}$ --.

Column 17, line 7, Equation (50) should read:

$$f \cdot t_j + S_j(1 - e^{-f \cdot t_j/74.07}) - T_j + c_j T_j^2 + i_j(T_1 - T_{j1})^3$$

line 25, Equation (51) should read: -- $F' = W(1 - e^{-f \cdot t/74.07})$ --;

line 28, change "Ultimately" to -- ultimately --.

UNITED STATES PATENT OFFICE
CERTIFICATE OF CORRECTION

Page 3

Patent No. 3,843,872      Dated October 22, 1974

Inventor(s) Naonobu Shimomura

It is certified that error appears in the above-identified patent and that said Letters Patent are hereby corrected as shown below:

Column 13, line 48, after "mentioned," delete "9".

Column 22, line 8, change "$T_2 \pm 100$" to -- $T_2 \leq 100$ --;

line 41, correct "273.15" to -- $B \times 273.15$ --;

line 56, after "105,232" correct ")" to -- ( --.

Column 24, line 37, delete "403" and "499" and substitute -- 503 -- and

497 --, respectively.

Column 26, line 26, between "in" and "with" insert -- accordance --.

Column 27, line 1, between "X" and "$X_0$" insert -- $\geq$ --.

Column 32, line 41, Equation should read:

-- $E = a + bt + ct^2 + \cdots + xt^N$ --;

line 43, "a, b, c, -x" should read -- a, b, c, ----, x --.

Signed and sealed this 18th day of March 1975.

(SEAL)
Attest:

RUTH C. MASON
Attesting Officer

C. MARSHALL DANN
Commissioner of Patents
and Trademarks